United States Patent [19]
Lloyd

[11] Patent Number: 5,997,010
[45] Date of Patent: Dec. 7, 1999

[54] COLLET FOR A MACHINE-TOOL CHUCK

[76] Inventor: Don R. Lloyd, 1645 E. 13 Mile, Apt. #302, Madison Heights, Mich. 48071

[21] Appl. No.: 09/186,132

[22] Filed: Nov. 4, 1998

Related U.S. Application Data

[63] Continuation of application No. PCT/US98/20372, Sep. 29, 1998.
[60] Provisional application No. 60/061,733, Sep. 29, 1997.

[51] Int. Cl.[6] .............................. B23B 31/20; B23B 31/40
[52] U.S. Cl. ....................... 279/2.03; 279/4.09; 279/46.5; 279/46.9; 279/50; 279/54; 279/157
[58] Field of Search ................................... 279/2.02–2.04, 279/4.07–4.09, 46.1, 46.2, 46.9, 50, 54, 157

[56] References Cited

U.S. PATENT DOCUMENTS

| | | |
|---|---|---|
| 2,373,592 | 3/1945 | Lovely . |
| 3,434,730 | 3/1969 | Semrkar . |
| 3,437,342 | 4/1969 | Mann . |
| 3,659,863 | 5/1972 | Buttner . |
| 3,900,913 | 8/1975 | Drumm . |
| 4,032,162 | 6/1977 | Flinchbaugh . |
| 4,042,162 | 8/1977 | Meginnis et al. . |
| 4,094,521 | 6/1978 | Piotrowski . |
| 4,296,658 | 10/1981 | Champeau et al. . |
| 4,432,559 | 2/1984 | Rasmussen . |
| 4,566,705 | 1/1986 | Jenny . |
| 4,791,841 | 12/1988 | Pruvot et al. . |
| 5,002,291 | 3/1991 | Reed et al. . |
| 5,613,692 | 3/1997 | Lloyd .................................... 279/2.03 |

*Primary Examiner*—Steven C. Bishop
*Attorney, Agent, or Firm*—Barnes & Thornburg

[57] ABSTRACT

A collet is provided to grip a workpiece with a uniformly distributed gripping force. The collet includes a plurlity of circumferentally spaced-apart radial slots extending partly through the collet and at least one opening extending radially all the way through the collet and lying between the end surfaces of the collet. Shim slots are formed in the end surfaces and a shim is mounted in the two shim slots to extend across the opening to block debris from moving therethrough. Coil springs are provided to bias a pair of collet segments to engage an actuator member of a machine-tool chuck. Methods of making the collet are also disclosed.

25 Claims, 16 Drawing Sheets

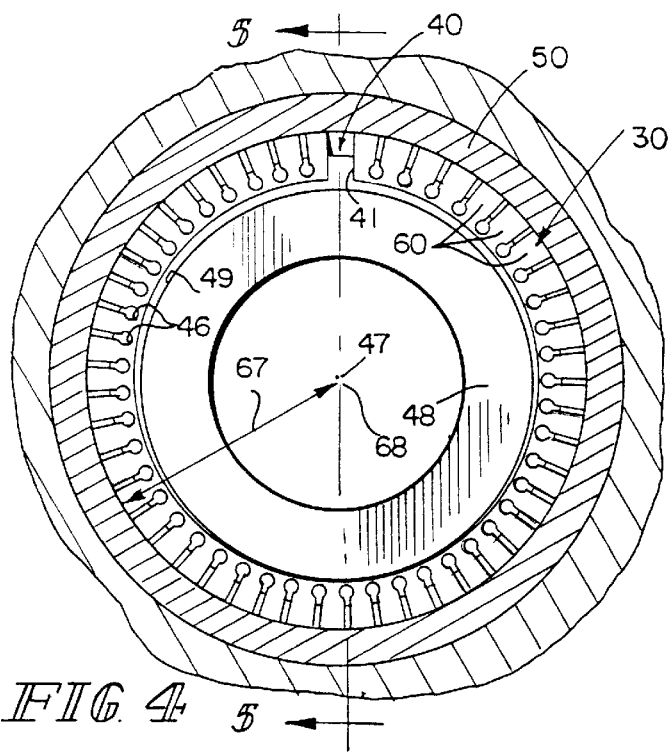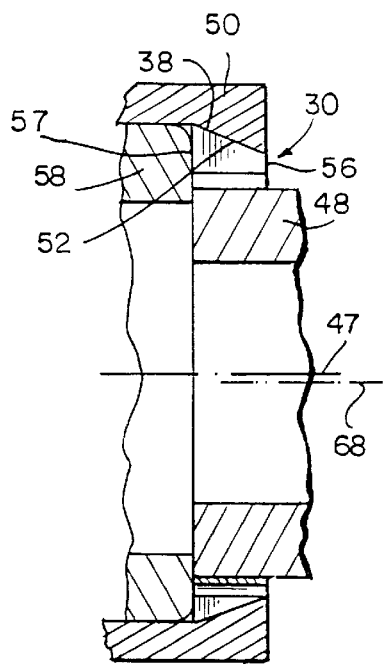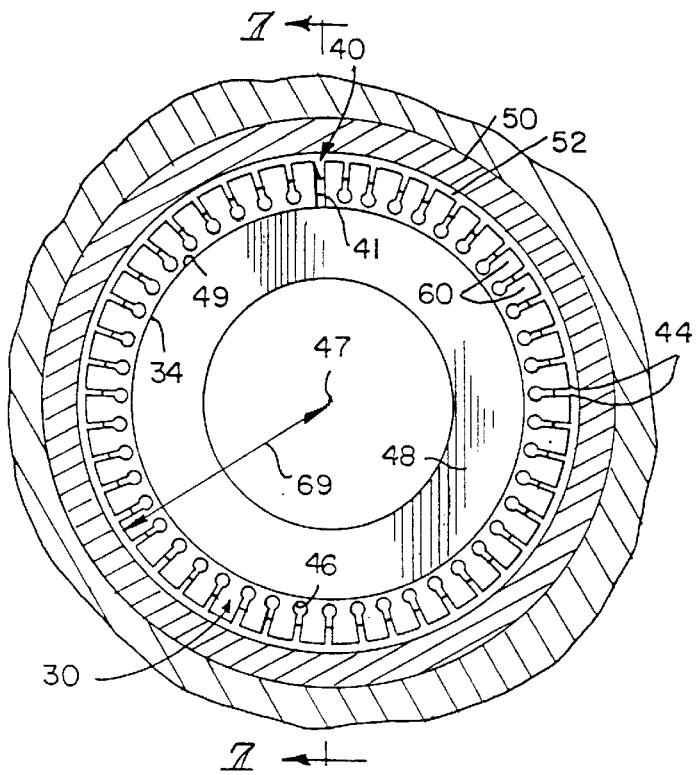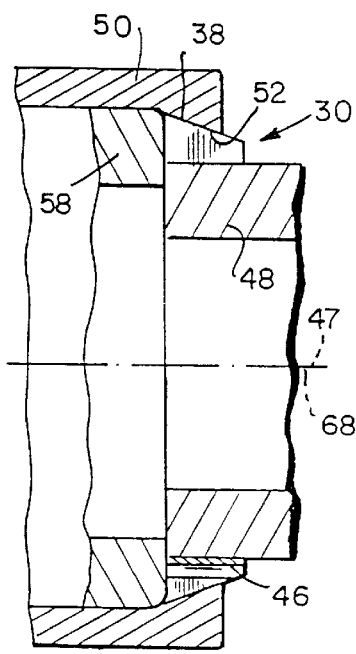
FIG. 4
FIG. 5
FIG. 6
FIG. 7

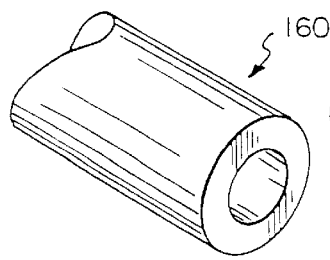
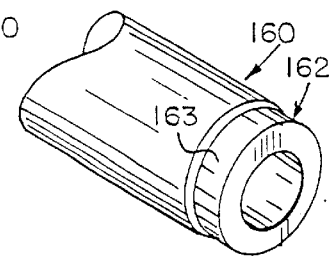
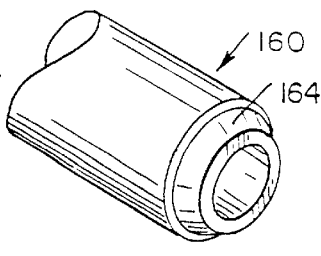
FIG. 8    FIG. 9    FIG. 10
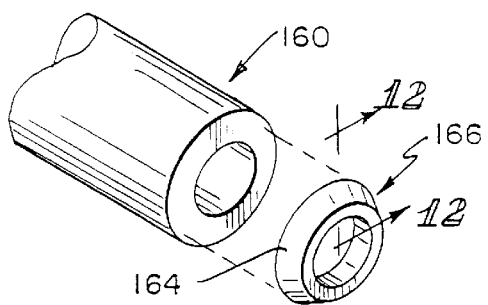
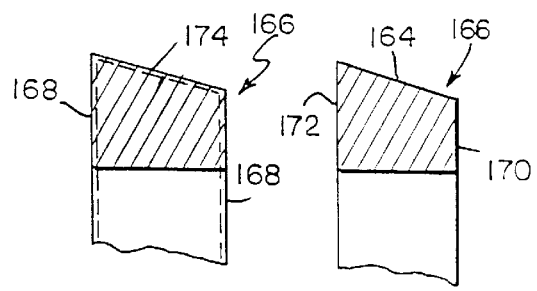
FIG. 11    FIG. 12    FIG. 13
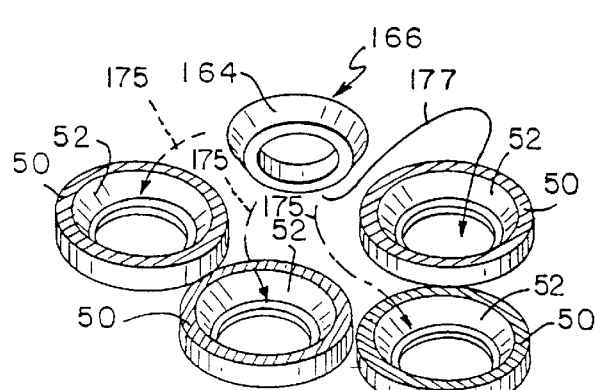
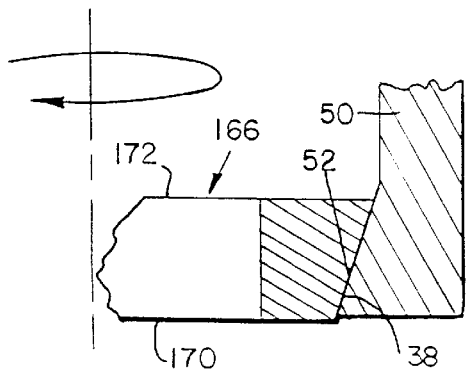
FIG. 14    FIG. 15
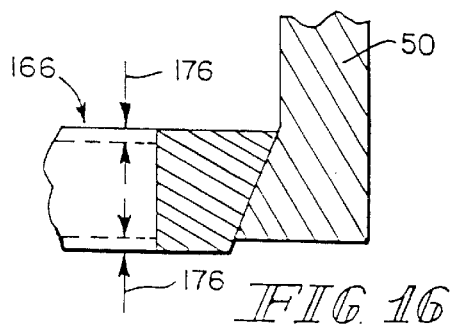
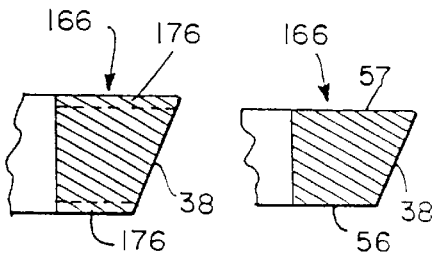
FIG. 16    FIG. 17    FIG. 18

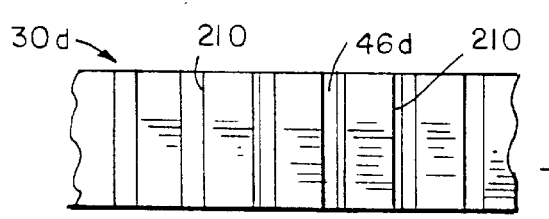
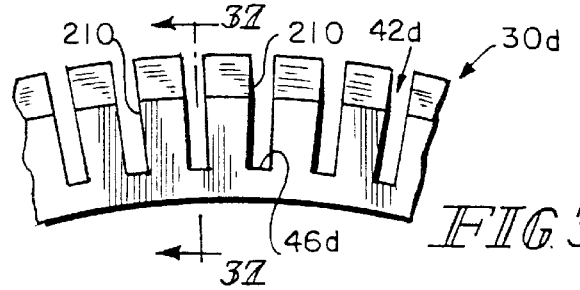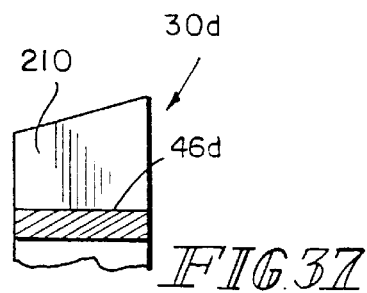
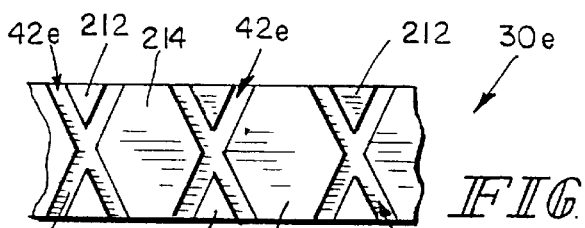
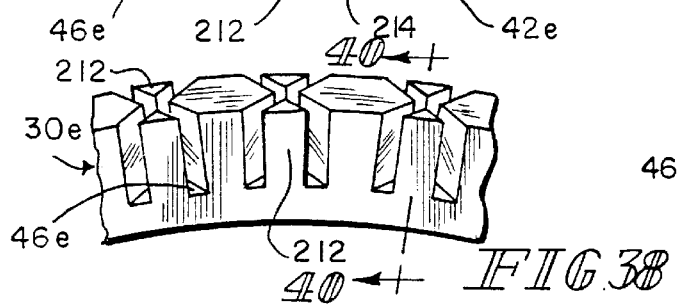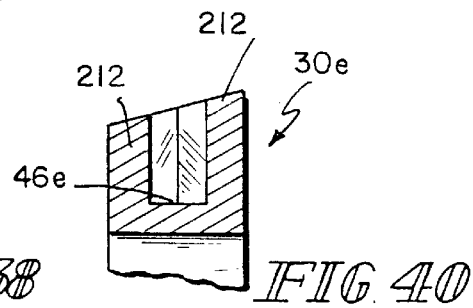

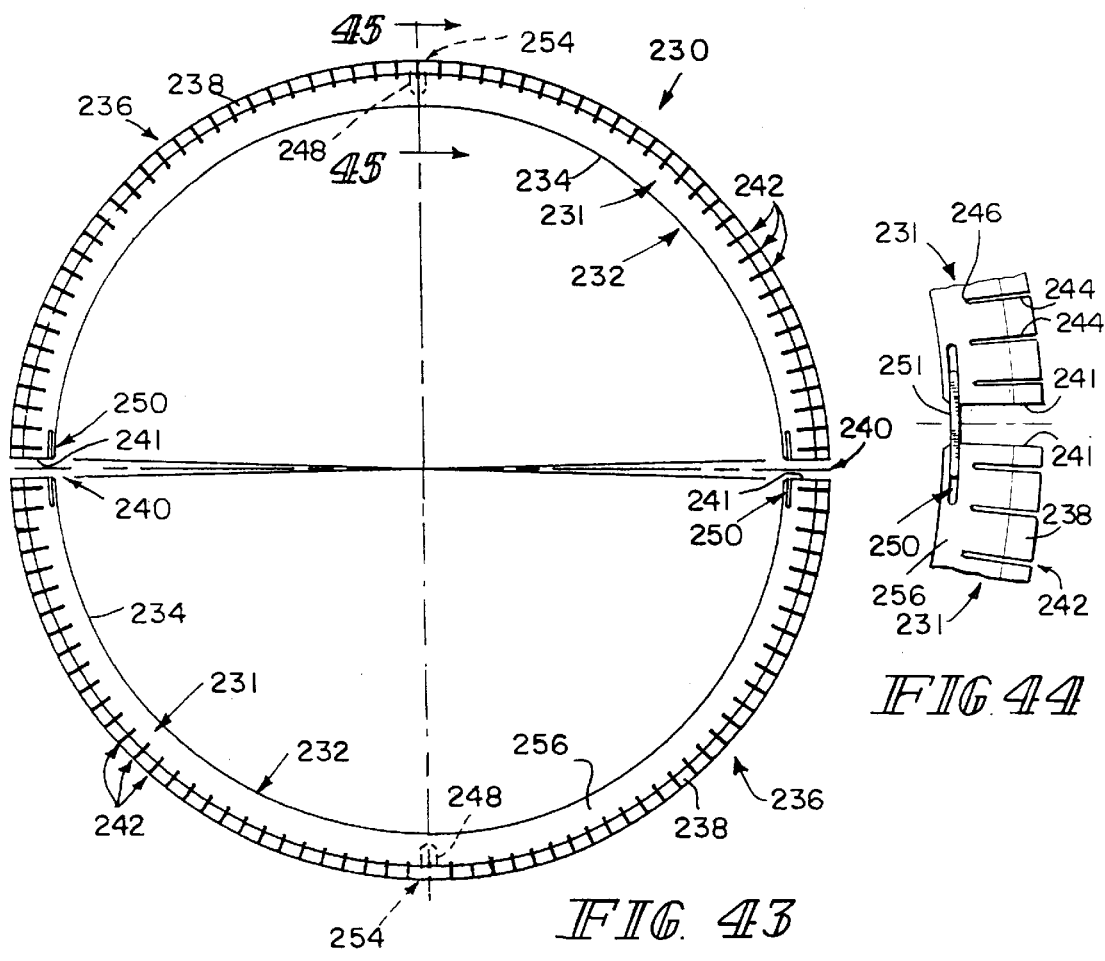
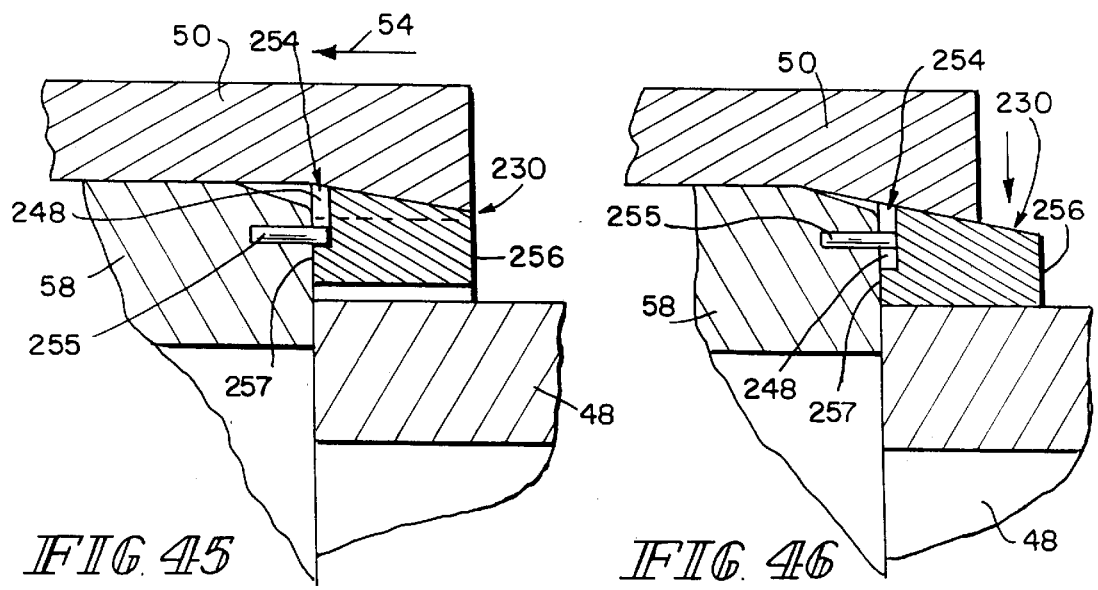

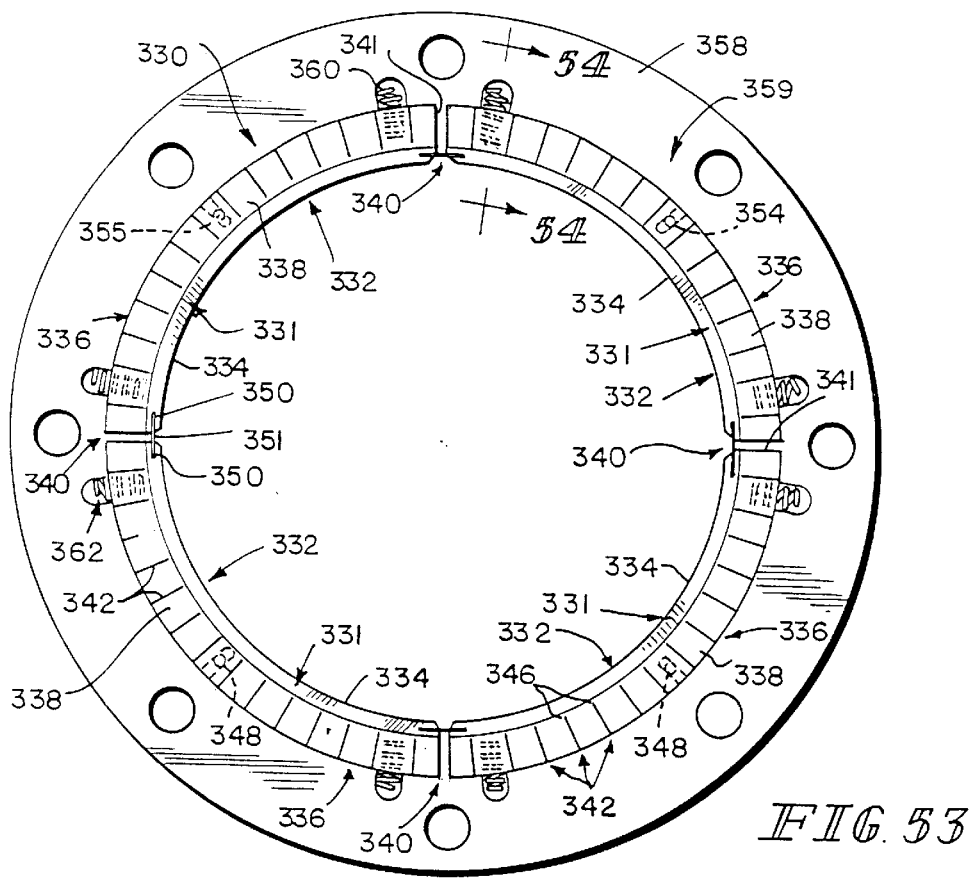
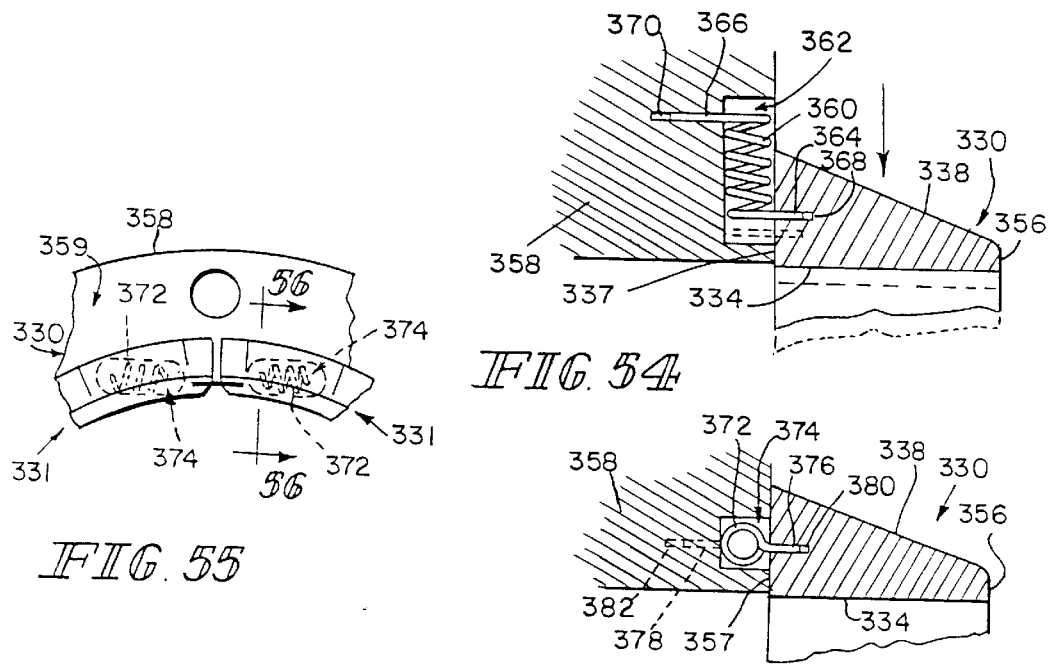

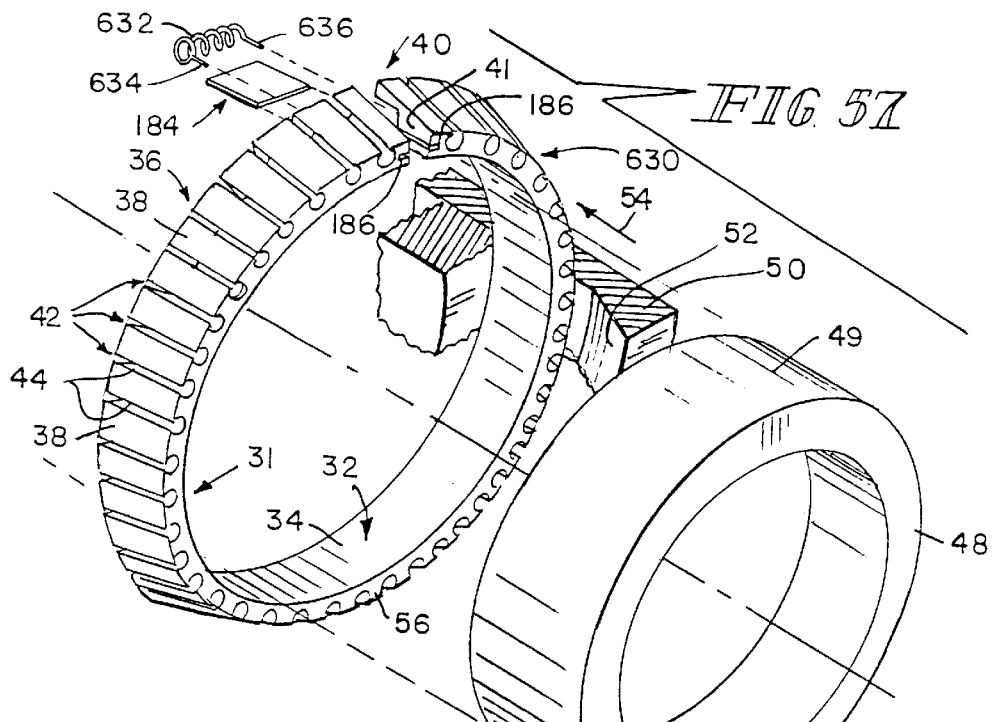
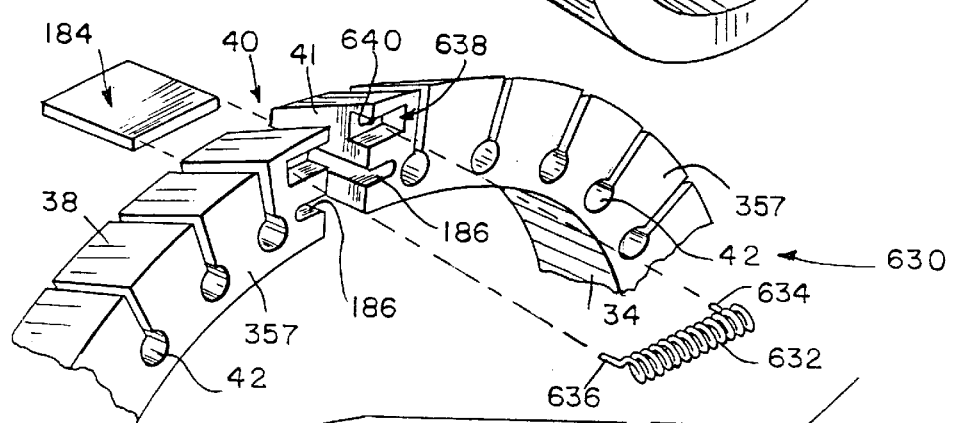
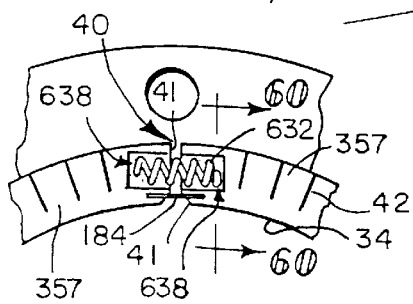
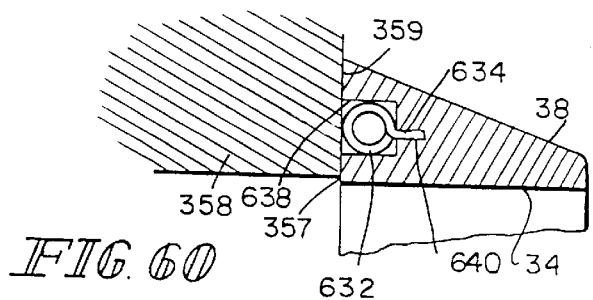

COLLET FOR A MACHINE-TOOL CHUCK

This application is a continuation of PCT application Ser. No. PCT/US98/20372, filed Sep. 29, 1998 which claims priority to U.S. Provisional Application Ser. No. 60/061,733, filed Sep. 29, 1997, both of which are hereby incorporated by reference.

BACKGROUND AND SUMMARY OF THE INVENTION

The present invention relates to workpiece holding devices and particularly, to high tolerance chucks for mounting a workpiece to a machine tool. More particularly, the present invention relates to a collet for a machine-tool chuck that is actuated by other components of the chuck to move the collet into gripping engagement with the workpiece.

A collet is a ring, band, or collar that is included as one of the components in a machine-tool chuck. The collet is the component of the chuck that grips and releases a workpiece. Chucks also include mechanisms that retain the collet in position and mechanisms that engage the collet to move the collet into gripping engagement with the workpiece to be machined by the machine tool. If the bore of a workpiece is to be gripped, the chuck will be configured to expand the collet radially outwardly into engagement with the bore of the workpiece and if the outside diameter of the workpiece is to be gripped, the chuck will be configured to contract the collet radially inwardly into engagement with the outside diameter of the workpiece. Some chucks include more than one collet and are configured to grip both the bore and outside diameter of the workpiece.

According to the present invention, a collet includes a flexible circular collet body having an outer circular periphery and an inner circular periphery. The flexible circular collet body is formed to include an opening extending between the outer and inner circular peripheries. One of the circular peripheries is formed to includes a workpiece-grip surface and the other of the circular peripheries is formed to include a tapered cam surface adapted to be engaged to flex the flexible circular collet body circularly so that the workpiece-grip surface engages a workpiece to be held by the collet. The tapered cam surface is formed to include a plurality of circumferentially spaced slots. Each slot includes an open end and terminates at an inner end between the inner and outer circular peripheries.

In preferred embodiments, if the collet is designed to grip the bore of a workpiece, the workpiece-grip surface is formed on the outer circular periphery of the collet body and the tapered cam surface is formed on the inner circular periphery of the collet body. In addition, each of the plurality of slots has the respective open end at the inner circular periphery and each slot extends outwardly toward the outer circular periphery. If the collet is designed to grip the outside diameter of the workpiece, the workpiece-grip surface is formed on the inner circular periphery of the collet body and the tapered cam surface is formed on the outer circular periphery of the collet body. In addition, each of the plurality of slots has the respective open end at the outer circular periphery and each slot extends inwardly toward the inner circular periphery.

The collet of the present invention is usable in a variety of different machine-tool chucks. Each of the chucks in which the collet is included as a component also includes an actuator member having a tapered surface that is complementary to the tapered cam surface formed in the collet. Each of the chucks with which the collet of the present invention is used also includes a chuck body which supports the actuator member for axial sliding movement.

During the manufacturing process of the collet and chuck, the collet is machined and matched with a particular actuator member and the tapered surfaces of each of these parts may be subjected to additional machining operations, if necessary, to further optimize the ability of the respective tapered surfaces to mate with one another. In addition, before the completion of each collet, a preassembly grind operation is performed on the workpiece-grip surface of the collet. The preassembly grind operation involves assembling the chuck together, actuating the actuator member, and then grinding the workpiece-grip surface with the actuator member actuated. Grinding the workpiece-grip surface in this manner compensates for any eccentricities or out-of-roundness conditions in the "total system." The rotational position of the collet during the preassembly grind operation is marked and an anti-rotation device is included in the chuck so that, after final assembly, the collet occupies the same radial position related to the other chuck components that was occupied by the collet during the preassembly grind operation.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 3 is a sectional view showing one possible example of a chuck including the collet of FIG. 1;

FIG. 4 is a sectional view taken along line 4—4 of FIG. 3 showing a workpiece inserted into the bore of the collet;

FIG. 5 is a sectional view taken along line 5—5 of FIG. 4;

FIG. 6 is a sectional view similar to FIG. 4 after the actuator member has been moved axially so that the tapered surface of the actuator member engages the tapered cam surface of the collet to flex the collet circularly into gripping engagement with the workpiece;

FIG. 7 is a sectional view taken along line 7—7 of FIG. 6;

FIGS. 8–25 show a series of manufacturing steps that are implemented to manufacture a collet in accordance with the present invention;

FIG. 8 is a perspective view showing an end of a piece of tubular bar stock from which collets are made;

FIG. 9 is a perspective view showing the piece of tubular bar stock after a reduced-diameter cylinder has been machined into the end of the piece of tubular bar stock of FIG. 8;

FIG. 10 is a perspective view showing the piece of tubular bar stock after a tapered surface has been machined into an outer surface of the reduced-diameter cylinder of FIG. 9;

FIG. 11 is a perspective view showing a collet blank separated away from the remaining piece of tubular bar stock;

FIG. 12 is a sectional view of the collet blank taken along line 12—12 of FIG. 11 showing the desired collet blank shape (in phantom) relative to the collet blank as it exists after the manufacturing steps illustrated in FIGS. 8–11 and after a heat treat operation (not illustrated);

FIG. 13 is a sectional view of the collet blank, similar to FIG. 12, after the front and rear end faces of the collet blank have been ground, or "qualified," to remove unwanted material and after the tapered surface has been ground to remove unwanted material;

FIG. 14 is a diagrammatic perspective view showing the process of matching the collet blank with a plurality of actuator members to determine which actuator member best matches the collet;

FIG. 15 is a diagrammatic sectional view showing the process of further honing or lapping the collet blank and its companion actuator member so that the tapered surface of the collet blank is transformed into a tapered cam surface that matches a tapered surface of the companion actuator member as closely as possible;

FIG. 16 is a sectional view similar to FIG. 15 showing the collet blank inserted into the companion actuator member so that measurements can be taken to determine how much, if any, material needs to be further removed from either of the end faces of the collet blank;

FIG. 17 is a sectional view, similar to FIG. 16, showing the collet blank after removal of the collet blank from the companion actuator member and showing the desired collet blank shape (in phantom) relative to the existing collet blank;

FIG. 18 is a sectional view, similar to FIG. 17, after the front and rear end faces of the collet blank have been ground to remove the unwanted material determined at the measurement step of FIG. 16;

FIG. 19 is a perspective view of the machine-tool chuck showing a preassembly grind operation in which the collet blank and the companion actuator member are assembled into the machine-tool chuck and an inner bore surface of the collet is machined to size with a boring bar;

FIG. 20 is a front view of the collet blank and the companion actuator member taken along line 20—20 of FIG. 19 showing an orientation mark formed across the front end faces of the collet and actuator member so that the collet and actuator member can be oriented properly at final assembly;

FIG. 21 is an exploded perspective view, with portions broken away, showing disassembly of the machine-tool chuck so that additional manufacturing operations can be performed on the collet blank;

FIG. 22 is a perspective view showing some of the plurality of slots formed in the collet blank by a wire EDM machine;

FIG. 23 is a perspective view of the collet blank of FIG. 22 after all of the slots have been formed showing the opening and a pair of opposing circumferential shim slots being formed by the wire EDM machine;

FIG. 24 is a perspective view of the collet blank of FIG. 23 flipped over to expose the rear end face of the collet blank showing an anti-rotation slot being milled into the bottom face of the collet blank to complete the transformation of the collet blank into the collet;

FIG. 25 is a perspective view of the collet of FIG. 24 showing a shim above the collet and aligned with the shim slots prior to insertion of the shim into the shim slots;

FIGS. 26–40 show a variety of slot profiles and cross sections that are consistent with the teachings of the present invention;

FIG. 26 is a front view of a portion of a collet having a first alternative slot configuration;

FIG. 27 is a plan view of the collet of FIG. 26;

FIG. 28 is a sectional view taken along line 28—28 of FIG. 26;

FIG. 29 is a front view of a portion of a collet having a second alternative slot configuration;

FIG. 30 is a plan view of the collet of FIG. 29;

FIG. 31 is a sectional view taken along line 31—31 of FIG. 29;

FIG. 32 is a front view of a portion of a collet having a third alternative slot configuration;

FIG. 33 is a plan view of the collet of FIG. 32;

FIG. 34 is a sectional view taken along line 34—34 of FIG. 32;

FIG. 35 is a front view of a portion of a collet having a fourth alternative slot configuration;

FIG. 36 is a plan view of the collet of FIG. 35;

FIG. 37 is a sectional view taken along line 37—37 of FIG. 35;

FIG. 38 is a front view of a portion of a collet having a fifth alternative slot configuration;

FIG. 39 is a plan view of the collet of FIG. 38;

FIG. 40 is a sectional view taken along line 40—40 of FIG. 38;

FIG. 43 is a front view of a collet in accordance with the present invention showing a pair of openings formed in the collet so that the collet is comprised of two collet body halves and showing a plurality of slots formed in each collet body half, the slots being configured so that inner ends of the slots define an elliptical pattern around the collet;

FIG. 44 is an enlarged front view of a portion of the collet of FIG. 43 showing a seventh alternative slot configuration and showing a shim received in a pair of opposing shim slots formed in the collet body halves;

FIG. 45 is sectional view taken along line 45—45 of FIG. 43 after the collet is mounted in a chuck showing an anti-rotation pin coupled to a chuck component and extending into an anti-rotation slot formed in the respective collet body half;

FIG. 46 is a view similar to FIG. 45 showing the collet moved from the unflexed position of FIG. 45 into a flexed position to grip a workpiece and the anti-rotation pin remaining in a fixed position during movement of the collet;

FIG. 53 is a front view of a collet in accordance with the present invention showing four openings formed in the collet so that the collet is comprised of four collet body segments, each collet body segment formed to include a plurality of slots, and a plurality of coil springs coupling each collet segment to a chuck body and biasing each collet body segment to a radially outward position;

FIG. 54 is a sectional view taken along line 54—54 of FIG. 53 showing each coil spring including an axially forwardly-extending free end coupled to the respective collet body segment and an axially rearwardly-extending free end coupled to the chuck body;

FIG. 55 is an enlarged front view of a collet similar to the collet of FIG. 53 showing coil springs coupling each collet segment to the chuck body;

FIG. 56 is a sectional view taken along line 56—56 of FIG. 55 showing each coil spring including an axially forwardly-extending free end coupled to the respective collet body segment and an axially rearwardly-extending free end coupled to the chuck body (in phantom);

FIG. 57 is a perspective view of another collet in accordance with the present invention showing an outer tapered cam surface of the collet formed to include a plurality of slots, an opening formed through the collet (at the top of the collet) bonded by a pair of end surfaces formed to include shim slots and pockets, the collet having a cylindrical inner workpiece-grip surface, a workpiece in front of the collet, a portion of a chuck body behind the collet, a portion of an actuator member having a tapered surface that engages the tapered cam surface of the collet as the actuator member is moved axially so that the collet flexes circularly into gripping engagement with the work piece, a shim adapted to be positioned in the shim slots, and a spring adapted to be positioned in the pockets;

FIG. 58 is a reverse perspective view of the collet of FIG. 57 showing the shim slots and pockets formed in the end surfaces of the collet, the shim aligned to be positioned to lie in the shim slots, and the spring aligned to be positioned to lie in the pockets;

FIG. 59 is a front view of a collet of FIG. 57 showing the spring biasing the collet;

FIG. 60 is a sectional view taken along line 60—60 of FIG. 59 showing the compression spring including an axially forwardly-extending free end coupled to the collet;

DETAILED DESCRIPTION OF THE DRAWINGS

Figure 1:
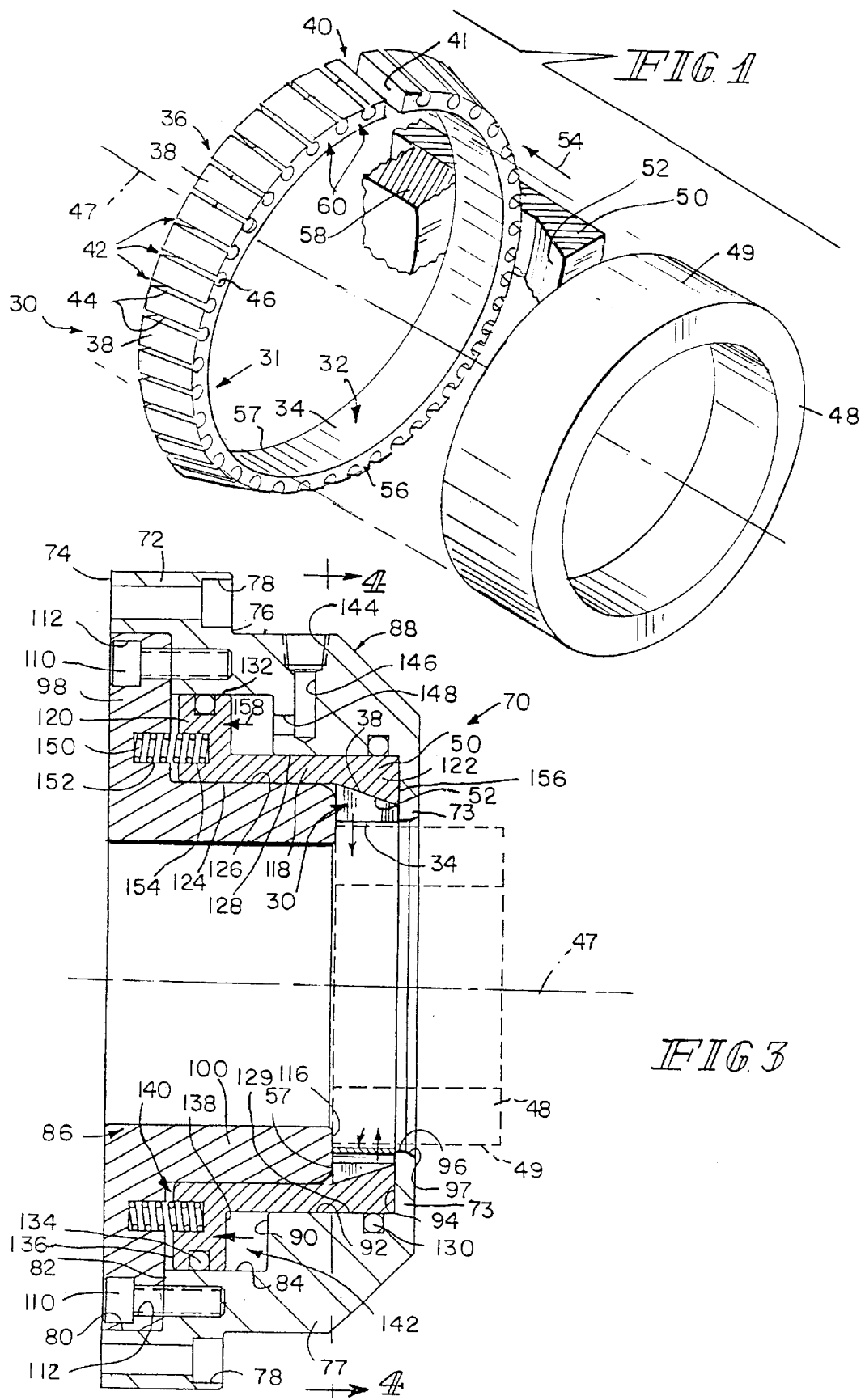
FIG. 1 is a perspective view of a collet in accordance with the present invention showing an outer tapered cam surface of the collet formed to include a plurality of slots, an opening formed through the collet (at the top of the collet), the collet having a cylindrical inner workpiece-grip surface, a workpiece in front of the collet, a portion of a chuck body behind the collet, and a portion of an actuator member having a tapered surface that engages the tapered cam surface of the collet as the actuator member is moved axially so that the collet flexes circularly into gripping engagement with the work piece.
Figure 61:
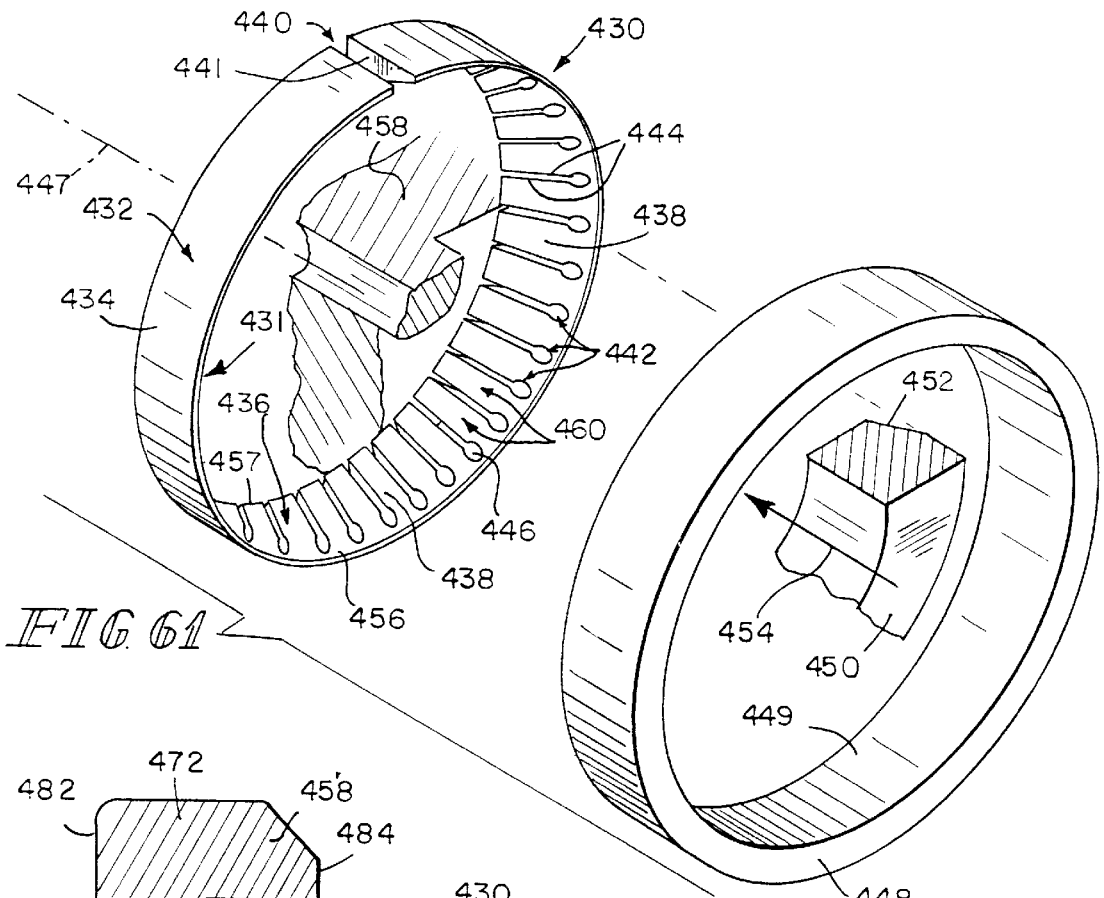
FIG. 61 is a perspective view of another collet in accordance with the present invention showing an inner tapered cam surface of the collet formed to include a plurality of slots, an opening formed through the collet (at the top of the collet), the collet having a cylindrical outer workpiece-grip surface, a workpiece in front of the collet, a portion of a chuck body behind the collet, and a portion of an actuator member having a tapered surface that engages the tapered cam surface of the collet as the actuator member is axially moved so that the collet flexes circularly into gripping engagement with the workpiece.
Figure 63:
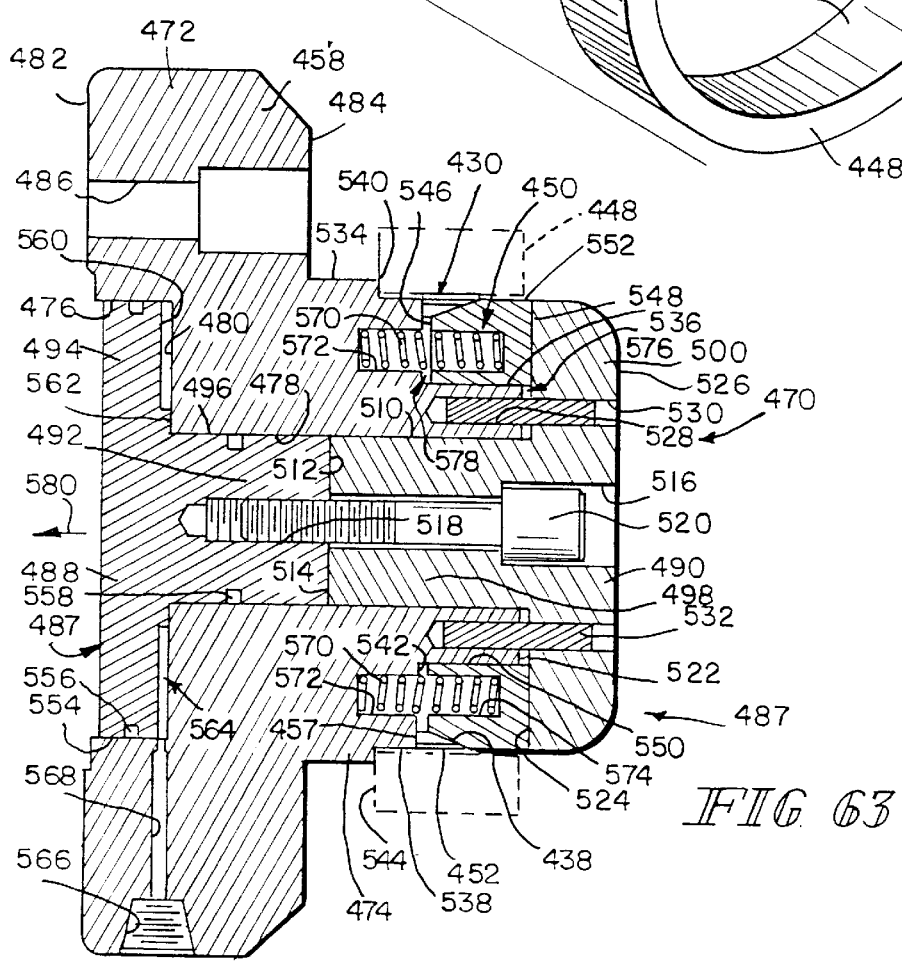
FIG. 63 is a sectional view showing one possible example of a chuck including the collet of FIG. 61.

According to the present invention, an inwardly flexing collet 30, shown in FIG. 1, is engaged by an actuator member of a chuck, an example of which is shown in FIG. 3, to flex collet 30 circularly from an unflexed position, shown in FIGS. 4 and 5, into a flexed position, shown in FIGS. 6 and 7, to grip the outside diameter of a workpiece 48. Also according to the present invention, an outwardly flexing collet 430, shown in FIG. 61, is engaged by an actuator member of a chuck, an example of which is shown in FIG. 63, to flex collet 430 circularly from an unflexed position, shown in FIGS. 64 and 65, into a flexed position, shown in FIGS. 66 and 67, to grip the inside diameter of a workpiece 448. Collets 30, 430 and the chucks in which collets 30, 430 are included are carefully manufactured, as shown, for example, in FIGS. 8–25 with reference to collet 30, so that collets 30, 430 grip respective workpieces 48, 448 with a uniformly distributed gripping force that is consistent and repeatable from workpiece to workpiece, thereby allowing very high tolerance machining operations to be performed on workpieces 48, 448.

Collet 30 includes a collet body 31 with an inner circular periphery 32 having a workpiece grip surface 34 and an outer circular periphery 36 having a tapered cam surface 38 as shown in FIG. 1. Collet 30 is formed to include an opening 40 extending through collet body 31 between inner and outer circular peripheries 32, 36. Collet 30 is also formed to include a plurality of circumferentially spaced-apart slots 42, each of which includes an open end 44 at tapered cam surface 38 and an inner end 46, shown best in FIG. 2, between inner and outer circular peripheries 32, 36. Collet 30 includes a front end face 56 and rear end face 57 that is substantially parallel to front end face 56. Slots 42 and opening 40 each extend axially all the way through collet 30 but only opening 40 extends radially all the way through collet 30.

Collet 30 is designed to flex circularly about an axis 47 so that workpiece grip surface 34 engages a workpiece, such as workpiece 48 shown in FIG. 1, to grip the workpiece. Workpiece 48 includes an outer surface 49 defining the outside diameter (O.D.) of workpiece 48. In use, collet 30 is flexed circularly, for example, by an annular actuator member 50 having a tapered surface 52 that is complementary to the tapered cam surface 38 of collet 30. Axial movement of actuator member 50 in a direction indicated by arrow 54 in FIG. 1 causes tapered surface 52 of actuator member 50 to engage tapered cam surface 38 of collet 30 resulting in circular or circumferential flexing of collet 30 so that workpiece grip surface 34 constricts around workpiece 48.

Opening 40 is bounded on either side by a pair of circumferentially facing end surfaces 41 that confront one another as shown in FIG. 1. When collet 30 is flexed circularly, in response to movement of actuator member 50 in direction 54, end surfaces 41 move toward one another, thereby narrowing opening 40.

A backing plate or a chuck body 58, a portion of which is shown in FIG. 1, is provided in some instances to constrain collet 30 from moving axially along with actuator member 50. Other structures that prevent collet 30 from moving axially along with actuator member 50 can be provided instead of backing plate 58. Thus, actuator member 50 moves axially relative to both chuck body 58 and collet 30 to cause radial and circumferential flexing of collet 30 relative to workpiece 48.

Opening 40 and slots 42 enhance the circumferential flexibility of collet 30. As any non-slotted ring-shaped or circular part having an opening therethrough is flexed circumferentially to close the opening, compressive stresses are generated at the inner diameter (I.D.) of the part and tensile stresses are generated at the outer diameter (O.D.) of the part. Compressive stresses act to compress the part material together and tensile stresses act to pull the part material apart. In general, materials are able to withstand a larger amount of compressive stress than tensile stress before catastrophic failure, such as fracturing, occurs or before plastic deformation of the part occurs. Thus, circumferentially flexing a circular part having an opening therethrough, so as to narrow the opening, creates a stress profile through the part between the I.D. and O.D. and a neutral point is established between the I.D. and O.D. such that tensile stresses exist radially outwardly from the neutral point and compressive stresses exist radially inwardly from the neutral point.

Tensile stresses and compressive stresses both resist flexing movement of the part and these stresses cooperate together to return the part to its initial unflexed position. The magnitude of the tensile stress at the O.D. of a part and the magnitude of the compressive stress at the I.D. of a part are a function of part geometry and how much the part is flexed. Other factors, such as the modulus of elasticity for the material from which the part is made, also plays a part in determining the compressive and tensile stress magnitudes. As a simple example, if a thick part and a geometrically similar thin part are flexed by the same amount, the thick part will have larger tensile stresses at its O.D. and larger compressive stresses at its I.D. compared to the thin part. Thus, more force will be required to flex the thick part than to flex the thin part by the same amount.

The cyclical creation and elimination of tensile stresses and compressive stresses in a part due to the repeated flexing and unflexing of the part eventually causes the part to "fatigue." As a result of this fatigue phenomenon, a part that experiences a lower amount of tensile and compressive stresses will be able to flex and unflex through more cycles before becoming fatigued.

Figure 2:
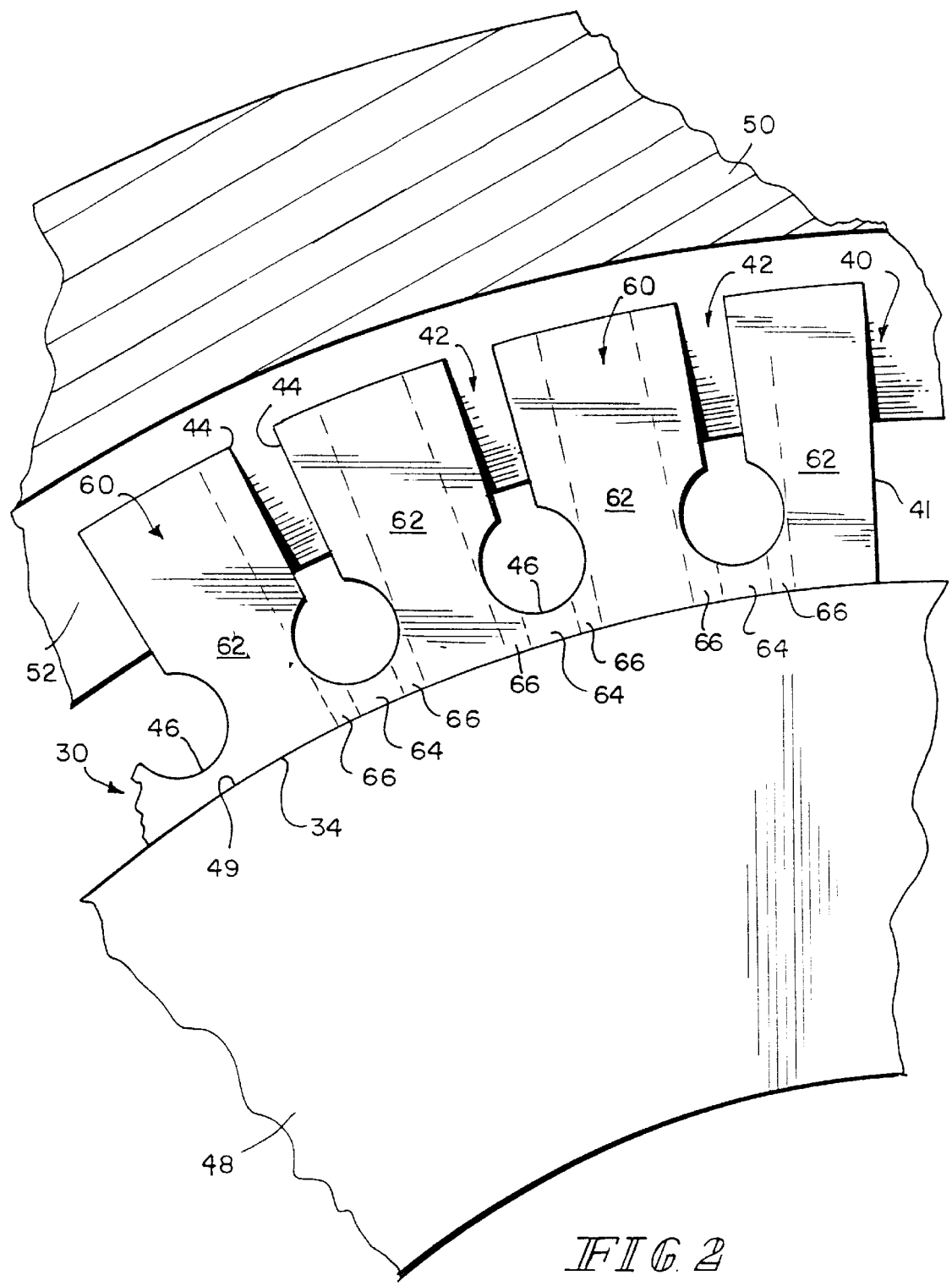
FIG. 2 is an enlarged view of the collet showing a small amount of collet material between an inner end of each slot and the workpiece to provide a flex zone radially inwardly of the inner end of each slot and a large amount of collet material between the slots to provide the collet with a plurality of arms, each having a force-transmission zone that is less flexible than the flex zones.

The formation of slots 42 in collet body 31 alters the manner in which the stress profile through collet 30 develops as collet 30 is flexed circularly. Slots 42 subdivide the outer portion of collet 30 into a plurality of arms 60. Each arm 60 provides a force-transmission zone 62 between tapered cam surface 38 and workpiece grip surface 34 as shown in FIG. 2. In addition, formation of slots 42 creates a plurality of flex zones 64 between inner ends 46 of respective slots 44 and workpiece grip surface 34 as also shown in FIG. 2. Each flex zone 64 is more flexible than each force-transmission zone 62. A transition zone 66 exists between each force-transmission zone 62 and each flex zone 64. It should be understood that the lines of demarcation between force-transmission zones 62, flex zones 64, and transition zones 66, shown in FIG. 2, are merely diagrammatic in nature to facilitate the description of the operation of collet 30.

As collet 30 is flexed circularly to grip workpiece 48, each of the flex zones 64 flexes more than each of the force-transmission zones 62 due to the small amount of collet material in each of the flex zones 64 compared to each of the force-transmission zones 62. In addition, slots 42 serve to isolate each arm 60 from each of the next adjacent arms 60 so that each arm 60 is cantilevered independently to extend radially outwardly from the inner circular periphery 32 of collet body 31. The absence of collet material between arms 60 allows arms 60 to "fan out" as collet 30 is flexed circularly, thereby allowing open end 44 of each slot 42 to widen. The slotted configuration of collet 30 results in reduced tensile stresses throughout arms 60 compared to the tensile stresses that would exist in the "arms" if slots were not formed in collet 30. Thus, slots 42 "relieve" the tensile stresses at the outer circular periphery 36 of collet body 31. The reduced tensile stress in each arm 60 contributes to the increased flexibility of collet 30 due to the reduction in resistance to flexing that is inherently achieved when tensile stresses are reduced as described above.

When actuator member 50 is actuated to flex collet 30 circularly into gripping engagement with workpiece 48, each arm 60 of collet 30 is wedged between actuator member 50 and workpiece 48. Thus, the force acting on actuator member 50 to move actuator member 50 axially in direction 54 is transmitted to workpiece 48 through arms 60. Collet 30 and actuator member 50 are carefully manufactured so as to mate closely together, as will be discussed below in more detail with reference to FIGS. 8–28. The close mating between collet 30 and actuator member 50 results in essentially the same amount of force being transmitted through each force-transmission zone 62 to workpiece 48. Because force-transmission zones 62, transition zones 66, and flex zones 64 are integrally appended to one another so that inner circular periphery 32 is one continuous piece, interrupted only by opening 40, the force transmitted through each force-transmission zone 62 can spread out through the next adjacent transition zones 66 and flex zones 64 to workpiece grip surface 34. The spreading of force from force-transmission zones 62 into transition zones 66 and flex zones 64 allows a substantially uniform gripping force about workpiece 48 to be established.

The amount of gripping force transferred from actuator member 50 to workpiece 48 is dependent upon the angle of taper between tapered cam surface 38 and workpiece grip surface 34 of collet 30. Multiplying the axial force applied to actuator member 50 along direction 54 by the cotangent of the angle between tapered cam surface 38 and workpiece grip surface 34 gives the gripping force generated between workpiece grip surface 34 and workpiece 48. Dividing the calculated gripping force by the area of workpiece grip surface 34 gives the workpiece gripping pressure established between collet 30 and workpiece 48.

Collet 30 can be used in a variety of chucks having different sizes and designs. A chuck 70, which is an example of one possible chuck design in which collet 30 can be used to grip workpiece 48, is shown in FIG. 3. Cylindrical chuck body 58 of chuck 70 includes an inner chuck body member 86 and an outer chuck body member 88. Outer chuck body member 88 includes a radially outwardly extending annular flange 72 at the rear end thereof and a radially inwardly extending cover flange 73 at the front end thereof. Annular flange 72 is formed to include a large bore defined by a rear bore surface 80 and cover flange 73 is formed to include a small workpiece-receiving bore defined by a front bore surface 96. A chamfer 97 is formed between the front face of cover flange 73 and bore surface 96.

Outer chuck body member 88 includes an intermediate portion 77 connecting annular flange 72 and cover flange 73 together. Intermediate portion 77 is formed to include a first bore defined by a reduced-diameter bore surface 84 and a second bore defined by a further reduced-diameter bore surface 92. Thus, outer chuck body member 88 includes four bore surfaces 80, 84, 92, 96 that are successively reduced in diameter between the rear end and front end of outer chuck body member 88, respectively.

Outer chuck body member 88 includes a first shoulder or wall 82 extending radially between bore surface 80 and bore surface 84, a second shoulder or wall 90 extending radially between bore surface 84 and bore surface 92, and a third shoulder or wall 94 extending radially between bore surface 92 and bore surface 96. Annular flange 72 has a rear surface 74 and a front surface 76 as shown in FIG. 3. Chuck 70 is mounted on a rotatable spindle of a machine tool, such as a lathe or grinder, by a plurality of bolts (not shown) that extend through bolt holes 78 formed in annular flange 72.

Inner chuck body member 86 includes a radially-extending annular flange 98 and a cylindrical portion 100 extending axially forwardly from annular flange 98 in a cantilevered arrangement. Annular flange 98 is encompassed by bore surface 80 and is seated securely against first shoulder 82 by a plurality of bolts 110 which extend through bolt holes 112 formed in annular flange 98 and into bolt holes 114 formed in outer chuck body member 88. The fit between annular flange 98 and bore surface 80 are closely toleranced so that the concentricity between inner chuck body member 86 and outer chuck body member 88 is optimized. Cylindrical portion 100 of inner chuck body member 86 includes a radially-extending annular front surface 116 that functions as a seat and stop for the inserted end of cylindrical workpiece 48. Annular front surface 116 of cylindrical portion 100 also functions as a seat or retainer for rear end face 57 of collet body 31.

Actuator member 50 of chuck 70 includes a piston rod or guide portion 118, a piston or annular flange portion 120 appended to the rear end of guide portion 118, and a collet-engaging portion 122 appended to the front end of guide portion 118 as shown in FIG. 3. Guide portion 118 includes an inner cylindrical surface 124 that slidingly engages an outer cylindrical surface 126 of cylindrical portion 100 of inner chuck body member 86. Surfaces 124, 126 are machined so as to minimize the radial play between actuator member 50 and inner chuck body member 86 while still allowing actuator member 50 to slide relative to inner chuck body member 86. Thus, the fit between inner cylindrical surface 124 of guide portion 118 and outer cylindrical surface 126 of cylindrical portion 100 are closely toleranced so that the concentricity between inner chuck body member 86 and actuator member 50 is optimized. Guide portion 118 also includes an outer cylindrical surface 128, a portion of which slidably engages bore surface 92 of outer chuck body member 88.

Tapered surface 52 of actuator member 50 is formed in collet-engaging portion 122 so as to mate with tapered cam surface 38 of collet body 31 as described above. Collet-engaging portion 122 also includes an outer cylindrical surface 129 that is coextensive with outer cylindrical surface 128 of guide portion 118. An O-ring seal 130 is mounted in a groove formed in bore surface 92. O-ring seal 130 sealingly engages outer cylindrical surface 129 of collet-engaging portion 122 of actuator member 50.

Piston portion 120 of actuator member includes an outer cylindrical surface 132 that slidingly engages bore surface 84. An O-ring seal 134 is mounted in a groove formed in outer cylindrical surface 132. O-ring seal 134 sealingly engages bore surface 84 of outer chuck body member 88. Piston portion 120 includes an annular rear surface 136 and an annular front surface 138 as shown in FIG. 3. A clearance space 140 is defined between rear surface 136 of piston portion 120 and annular flange 98 of inner chuck body member 86. In addition, a fluid-receiving chamber 142 is defined between front surface 138 of piston portion 120 and shoulder 90 of outer chuck body member 88.

Outer chuck body member 88 is formed to include a fluid inlet port 144, a first passage 146 in fluid communication with inlet port 144, and a second passage 148 in fluid communication with both first passage 146 and fluid-receiving chamber 142. Chuck 70 includes a plurality of compression springs 150, each of which includes a rear end mounted in a bore 152 formed in annular flange 98 and a front end mounted in an aligned bore 154 formed in piston portion 120. When actuator member 50 is in an unactuated position, compression springs 150 bias actuator member 50 away from annular flange 98 until a front end face 156 of collet-engaging portion 122 engages cover flange 73 as shown in FIG. 3. Receipt of compression springs 150 in bores 152, 154 constrains actuator member 50 from rotating relative to inner and outer chuck body members 86, 88. It is also within the scope of the invention as presently perceived for actuator member 50 to be doweled or keyed to either or both of inner and outer chuck body members 86, 88 to prevent rotation therebetween.

Before actuator member 50a is actuated, workpiece 48 is inserted into internal circular periphery 32 of collet body 31, with its inserted end seated against front surface 116 of cylindrical portion 100 of inner chuck body member 86 as described above. When workpiece 48 is initially seated against front surface 116, collet 30 is in an expanded position as shown in FIGS. 3–5. In addition, when workpiece 48 is seated against front surface 116 and actuator member 50 is unactuated, a small amount of clearance exists between workpiece 48 and workpiece grip surface 34 of collet 30. The clearance between workpiece 48 and collet 30 permits workpiece 48 to be shifted into an eccentric orientation relative to collet 30 so that an axis 68 of workpiece 48 is offset by a slight amount from axis 47 of collet 30 as shown in FIGS. 4 and 5.

To actuate actuator member 50, a source of pressurized fluid, such as air or hydraulic fluid, is coupled to fluid inlet port 144 and an amount of pressurized fluid is forced, at a controlled pressure, through fluid inlet port 144 and fluid passages 146, 148 into fluid-receiving chamber 142. Receipt of pressurized fluid in chamber 142 causes a uniform force to be exerted circumferentially against front surface 138 of piston portion 120 to move axially actuator member 50 relative to inner and outer chuck body members 86, 88 and collet 30 toward the rear end of chuck 70 in a direction indicated by arrows 158 shown in FIG. 3. During movement of actuator member 50 in direction 158, clearance gap 140 is narrowed and compression springs 150 are further compressed.

As actuator member 50 moves axially in response to the pressurized fluid being forced into fluid-receiving chamber 142, tapered surface 52 of actuator member 50 engages tapered cam surface 38 of collet 30 to flex collet 30 circularly so that collet 30 contracts both radially and circumferentially to move workpiece grip surface 34 into engagement with workpiece 48 as shown in FIGS. 6 and 7. The flexing motion of collet 30 causes workpiece 48 to be drawn into concentric relation with collet 30 so that axis 68 of workpiece 48 substantially coincides with axis 47 of collet 30. When the fluid pressure is released, compression springs 150 act between annular flange 98 and actuator member 50 to move actuator member 50 in an axial direction opposite to direction 158 to permit collet 30 to expand back into its initial expanded position as shown in FIG. 3.

When actuator member 50 is unactuated, rear end face 57 of collet 30 has an outer diameter 67 and opening 40 has a wide configuration as shown in FIG. 4. When actuator member 50 is actuated and collet 30 flexes circularly to grip workpiece 48, rear end face 57 has an outer diameter 69 that is smaller than diameter 67 and opening 40 has a narrow configuration as shown in FIG. 6.

When actuator member 50 is actuated to flex collet 30 circularly into engagement with workpiece 48, there is relative circumferential movement between collet 30 and actuator member 50 and also between collet 30 and workpiece 48. The complementary fit between tapered surface 52 of actuator member 50 and tapered cam surface 38 of collet 30, along with the circular flexing motion of collet 30, ensures that collet 30 is kept centered relative to actuator member 50 and the circular flexing motion of collet 30 relative to workpiece 48 ensures that workpiece 48 is centered relative to collet 30 when workpiece grip surface 38 of collet 30 attains full contact with workpiece 48.

After collet 30 is flexed circularly into engagement with workpiece 48, workpiece 48 acts against collet 30 to resist further circumferential flexing of collet 30, thereby resisting further axial movement of actuator member 50 in direction 158 relative to inner and outer chuck body members 86, 88. When the resistance of workpiece 48 against collet 30 balances the force of actuator member 50 against collet 30, collet 30 no longer flexes circularly and actuator member 50 no longer moves axially. In this equilibrium state, a controlled gripping force between collet 30 and workpiece 48 is established. Thus, by controlling the pressure of the pressurized fluid, the gripping force of the collet is controlled. Using pressurized fluid to actuate actuator member 50 ensures that the gripping force of collet 30 against successive workpieces having different outer diameters is substantially the same because the gripping force is not dependent on the diameter of workpiece 48 but is controlled only by the pressure of the fluid.

In applications where chuck 70 is rotated at a high speed of rotation, centrifugal forces may become large enough to cause radial expansion of the various chuck components, such as collet 30 and actuator member 50, as well as workpiece 48. Using pressurized fluid to actuate actuator member 50 ensures that collet 30 is forced against workpiece 48 with a substantially constant gripping force even if radial expansion of the chuck components or workpiece occurs because the pressurized fluid causes actuator member 50 to be adjusted automatically so that the equilibrium state is maintained.

Collet 30 can be made from any one of a number of materials. Although collets made from a Delrin™ plastics material have proven to be suitable in some applications, a majority of the collets made in accordance with the present invention have been made from spring steel, such as S.A.E. spring steel 6150, and have exhibited the desired performance characteristics in a variety of applications. To manufacture collet 30 from spring steel, a portion of tubular bar stock 160, shown in FIG. 8, is machined so that a reduced-diameter cylinder 162 having an outer surface 163 is formed at an end of tubular bar stock 160, as shown in FIG. 9. Next, the material at outer surface 163 of reduced-diameter cylinder 162 is machined to form a tapered surface 164, shown in FIG. 10. The machining of reduced-diameter cylinder 162 into the end of tubular bar stock 160 and the machining of tapered surface 164 into outer surface 163 of reduced-diameter cylinder 162 can be done by single-point high speed turning, for example.

After the formation of tapered surface 164 in reduced-diameter cylinder 162, the tapered end of tubular piece of bar stock 160 is cut away from the remainder of tubular bar stock 160, thereby creating a collet blank 166 as shown in FIG. 11. The process of forming reduced-diameter cylinder 162, forming tapered surface 164 into outer surface 163 of reduced-diameter cylinder 162, and then detaching collet blank 166 from the remainder of tubular bar stock 160 is repeated until a desired number of collet blanks 166 are created.

After formation of collet blank 166 as shown in FIGS. 8–11, collet blank 166 is heat treated to a hardened Rockwell C hardness of about 44–46. After being heat treated, collet blank 166 is "qualified," which involves grinding unwanted material 168, shown in FIG. 12, away from the axial ends of collet blank 166 until front and rear end faces 170, 172, shown in FIG. 13 are formed. Qualifying collet blank 166 brings collet blank 166 closer to its finished axial length. Next, tapered surface 164 of collet blank 166 is ground to remove unwanted material 174, shown in FIG. 12, so that tapered surface 164 is formed as shown in FIG. 13. After grinding tapered surface 164, collet blank 166 is matched with a companion actuator member 50 having a tapered surface 52 that closely mates with tapered surface 164 of collet blank 166 as shown in FIG. 14. A "bluing" process (not shown) is used to determine how well tapered surface 164 of collet blank 166 matches tapered surface 52 of several different actuator members 50. For example, in FIG. 14, a dotted arrow 176 indicates each of the various attempts to match collet blank 166 with respective actuator members 50 pointed to by respective dotted arrows 175 and a solid arrow 177 extends from collet blank 166 to indicate the actuator member 50 with which collet blank 166 matches best.

After one of actuator members 50 and collet blank 166 have been paired, each actuator member 50 and collet blank 166 may undergo an additional honing or lapping operation to enhance further the mating between tapered surfaces 52, 164 of actuator member 50 and collet blank 166 as shown diagrammatically in FIG. 15. The additional honing and lapping operations transform tapered surface 164 of collet blank 166 into tapered cam surface 38 of collet 30. Because the load applied to tapered cam surface 38 of finished collet 30 by actuator member 50 is transferred to workpiece 48 through force-transmission zones 62, transition zones 66, and flex zones 64, as described above, the careful matching of actuator member 50 and collet blank 166, as shown in FIGS. 14 and 15, increases the ability of the finished collet 30 to grip workpiece 48 with a substantially uniform gripping force.

After the steps to optimize the mating between tapered surface 52 of actuator member 50 and tapered surface 164 of collet blank 166, collet blank 166 and actuator member 50 are coupled together and an amount of additional unwanted material 176 that needs to be ground away from one or both of faces 170, 172 of collet blank 166 is measured as shown in FIG. 16. Collet blank 166 is then separated away from actuator member 50, as shown in FIG. 17, and end faces 170, 172 are ground to create front end face 56 and rear end face 57 of collet blank 166 as shown in FIG. 18. The overall chuck design dictates whether one or both of faces 170, 172 of collet blank 166 are measured for removal of additional unwanted material 176. For example, as shown in FIG. 3, the front end face 56 of collet 30 is flush with front end face 156 of actuator member 50 before actuator member 50 is actuated. Thus, with reference to chuck 70, which is just one of many chuck embodiments that are possible, the amount of unwanted material 176 that needs to be ground away from front end face 170 of collet blank 166 can be determined.

Figure 19:
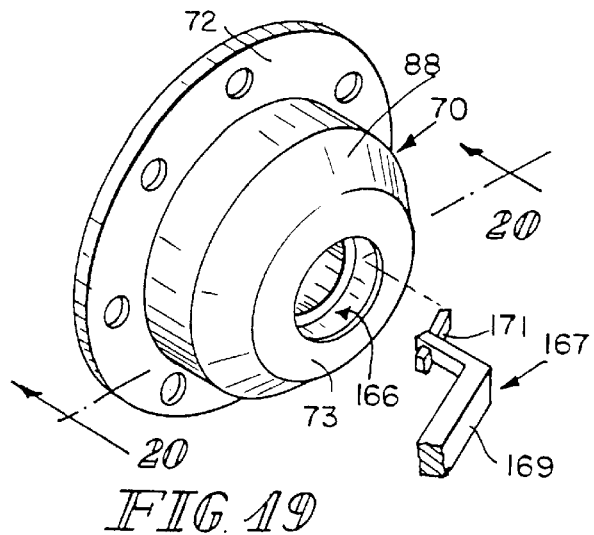

Next a preassembly grind operation, such as honing, grinding, or boring with a boring bar 167, is performed on the I.D. (inner diameter) of collet blank 166 as shown in FIG. 19. Boring bar 167 includes holder 169 and a cutting blade 171 positioned to lie in holder 169.

During the preassembly grind operation, the chuck into which collet blank 166 will later be installed as collet 30, is assembled together and actuator member 50 is actuated with a predetermined amount of force to wedge tapered surface 52 of actuator member 50 and tapered cam surface 38 together. After actuation of actuator member 50, the I.D. of collet blank 166 is ground to a specified diameter by cutting blade 171 which is application specific. Actuator member 50 is either made from a material having a higher hardness than collet 30, or, if actuator member 50 is made of the same material as collet 30, actuator member 50 is heat treated to a higher hardness. For example, if collet 30 and actuator member 50 are both made of 6150 spring steel material and if collet 30 has a hardness of 44–46, actuator member 50 is heat treated to a Rockwell C hardness of about 58.

Figure 20:
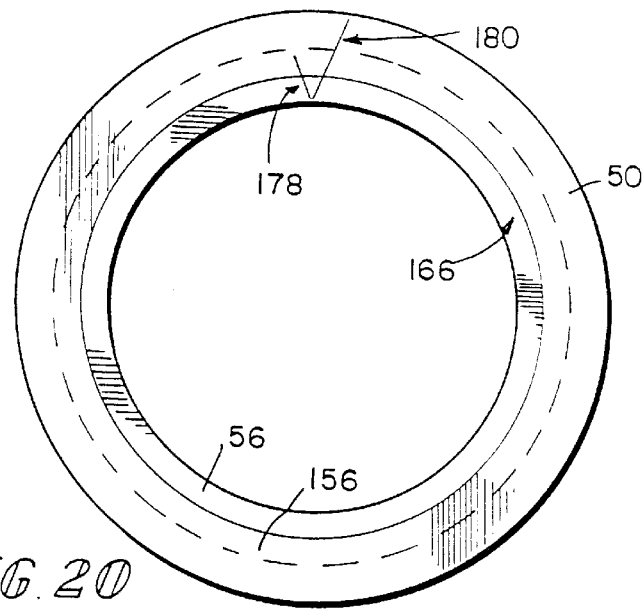

The preassembly grind operation, shown in FIG. 19, compensates for any inaccuracies, such as eccentricities or out-of-roundness conditions, that are present in the fully-assembled chuck because the inaccuracies are "ground out" of the I.D. of collet blank 166. After the preassembly grind operation, the orientation of collet blank 166 relative to actuator member 50 is marked, for example, by V-marking front end face 56 of collet blank 166 and front end face 156 of actuator 50 as shown in FIG. 20. V-marking creates a first indicia of orientation 178 on collet blank 30 and a second indicia of orientation 180 on actuator member 50. Later, when the chuck components are reassembled, aligning the first indicia of orientation 178 with the second indicia of orientation 180 ensures that finished collet 30 and actuator member 50 are placed back into substantially the same orientation that existed when the preassembly grind operation was performed. Reassembling collet 30 and actuator member 50 back into their preassembly-grind orientation, optimizes the ability of collet 30 to center workpiece 48 relative to the chuck while gripping workpiece 48.

Figure 21:
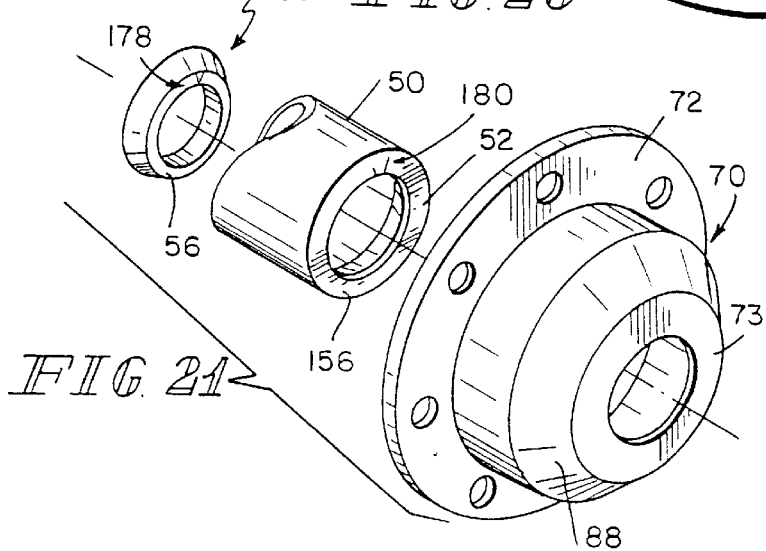

After the preassembly grind operation shown in FIG. 19 and the marking operation shown in FIG. 20, the chuck is disassembled, as shown in FIG. 21, so that additional manufacturing operations can be performed on collet blank 166. When collet blank 166 is disassembled from the chuck, all of the external surfaces of collet blank 166, including workpiece-gripping surface 34, tapered cam surface 38, front end face 56, and rear end face 57 are completed and collet blank 166 has the same basic external geometry that collet 30 will have in its unflexed state.

Figure 22:
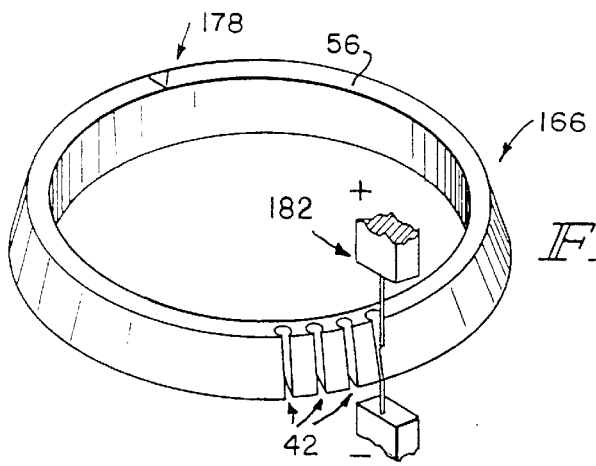
Figure 23:
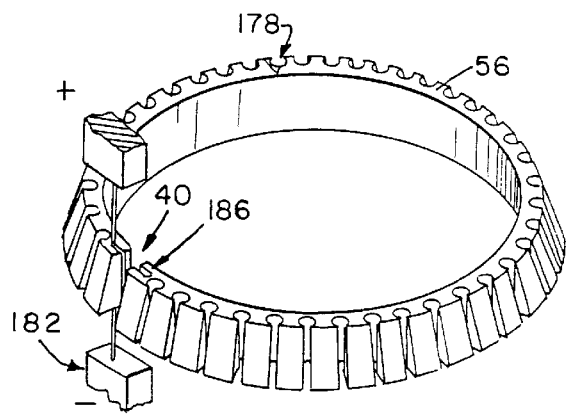

After collet blank 166 as been removed from the chuck, slots 42 are formed in collet blank 166 as shown in FIG. 22. Although there are a variety of ways in which slots 42 can be formed in collet blank 166, such as milling or drilling and grinding, the preferred method is to use a wire electrical discharge machine 182 (wire EDM) to form slots 42. After all of slots 42 have been formed in collet blank 166, wire EDM 182 then forms opening 40 in collet blank 166 as shown in FIG. 23. One embodiment of collet 30 includes a shim 184, shown in FIG. 25, that is arranged to extend across opening 40 to block debris from moving radially through opening 40 during the use of collet 30 in a machine-tool chuck. If collet 30 includes shim 184, wire EDM 182 forms a pair of opposing shim slots 186 after opening 40 is formed, as also shown in FIG. 23.

Figure 24:
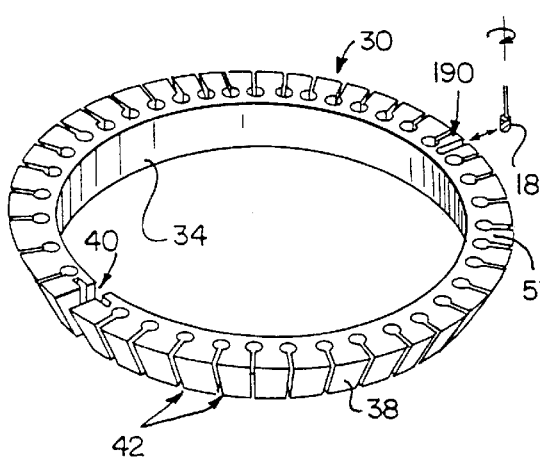

After slots 42, opening 40, and shim slots 186 are formed by wire EDM 182 in collet blank 166, a cutter 188 mills a radially-extending anti-rotation slot 190 into rear end face 57 of collet blank 166 as shown in FIG. 24. An anti-rotation pin, which is coupled to one of the chuck components, is received by anti-rotation slot 190 to constrain collet 30 from rotating relative to actuator member 50. Thus, receipt of the anti-rotation pin in anti-rotation slot 190 ensures that the radial orientation between collet 30 and actuator member 50 during the preassembly grind operation is maintained during the repeated flexing and unflexing of collet 30.

Figure 25:
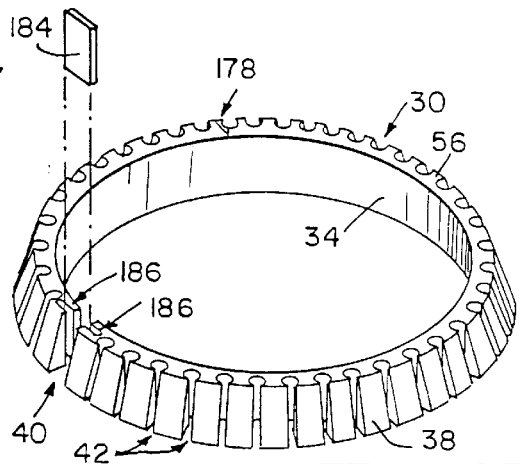

After anti-rotation slot 190 is milled into collet blank 166 as shown in FIG. 24, the transformation of collet blank 166 into collet 30 is complete as shown in FIG. 25. After the transformation of collet blank 166 into collet 30, any additional collet components, such as shim 184 are attached to collet 30. After collet 30 has been completed, collet 30 can be assembled into the chuck for which it has been manufactured and operated as described above.

Although collet 30 is shown in FIGS. 1–7 and 25 as having narrow slots 42 that extend from respective open ends 44 to an enlarged circular inner end 46, it is within the scope of the invention as presently perceived for slots having many other shapes and sizes to be formed in collet body 31. FIGS. 26–40 show a variety of slot shapes and cross sections that are consistent with the teachings of the present invention. Slots having other shapes could be formed as well.

Figure 27:
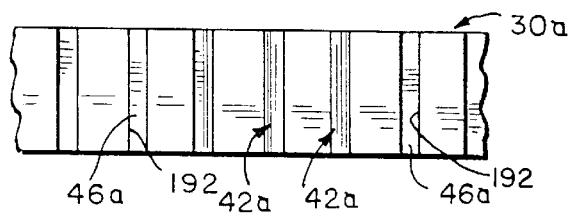
Figure 26:
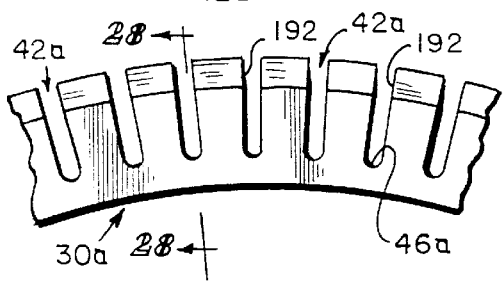
Figure 28:
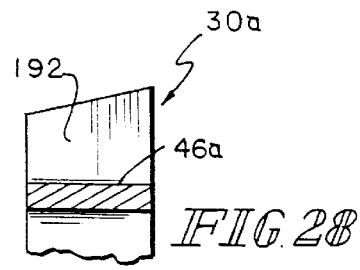
Figure 30:
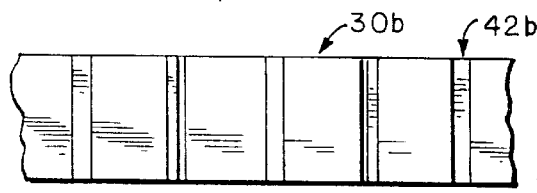
Figure 29:
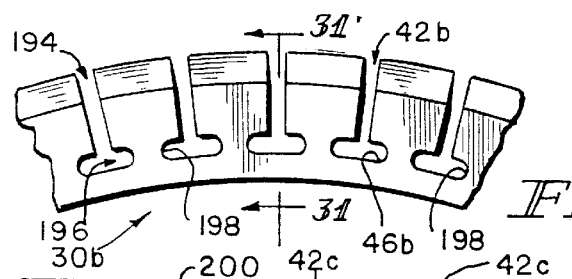
Figure 31:
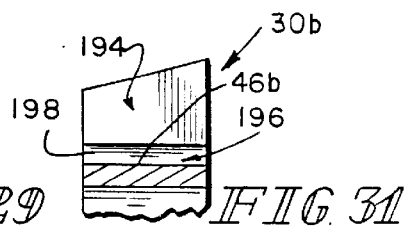
Figure 33:
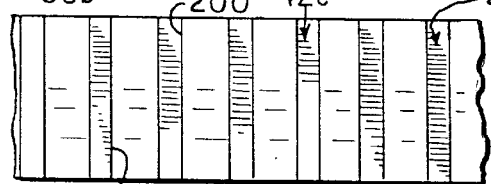
Figure 32:
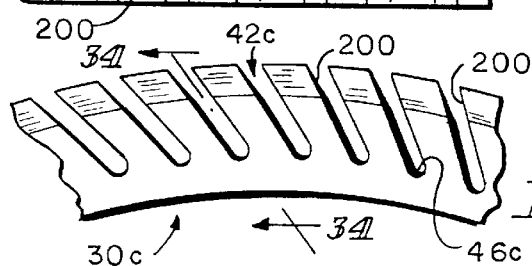
Figure 34:
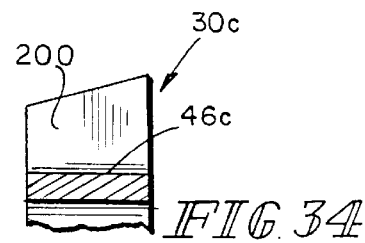

FIGS. 26–28 show a collet 30a having a plurality of straight slots 42a, each of which is bounded by a pair of spaced-apart straight and parallel side walls 192 and an arcuate inner end 46a. FIGS. 29–31 show a collet 30b having a plurality of T-shaped slots 42b, each of which include a radially-extending portion 194 and a circumferentially-extending portion 196. Circumferentially-extending portions 196 of slots 42b are each bounded by a flat inner end 46b that extends between arcuate circumferential ends 198 as shown in FIG. 29. FIGS. 32–34 show a collet 30c having a plurality of angled slots 42c, each of which is bounded by and arcuate inner end 46c and a pair of spaced-apart straight side walls 200 that are angled relative to the collet radius.

FIGS. 35–37 show a collet 30d having a plurality of straight slots 42d, each of which is bounded by a pair of spaced-apart straight and parallel side walls 210 and a flat inner end 46d. FIGS. 38–40 show a collet 30e having a plurality of X-shaped slots 42e. The X-shaped slots 42e cooperate to form a plurality of small arms 212 of triangular cross section and a plurality of arms 214 of hexagonal cross section. In addition, each X-shaped slot 42e is bounded by a flat inner end 46e.

Figure 41:
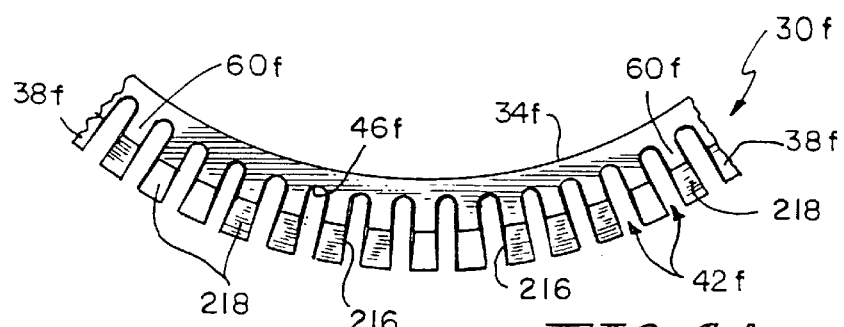
FIG. 41 is a front view of a portion of a collet having a sixth alternative slot configuration that is similar to the slot configuration shown in FIGS. 26–28 except a plurality of arms defined by the slots, each have non-parallel side walls and an outer peripheral surface that varies in arc length between the front end face and the rear end face of the collet.
Figure 42:
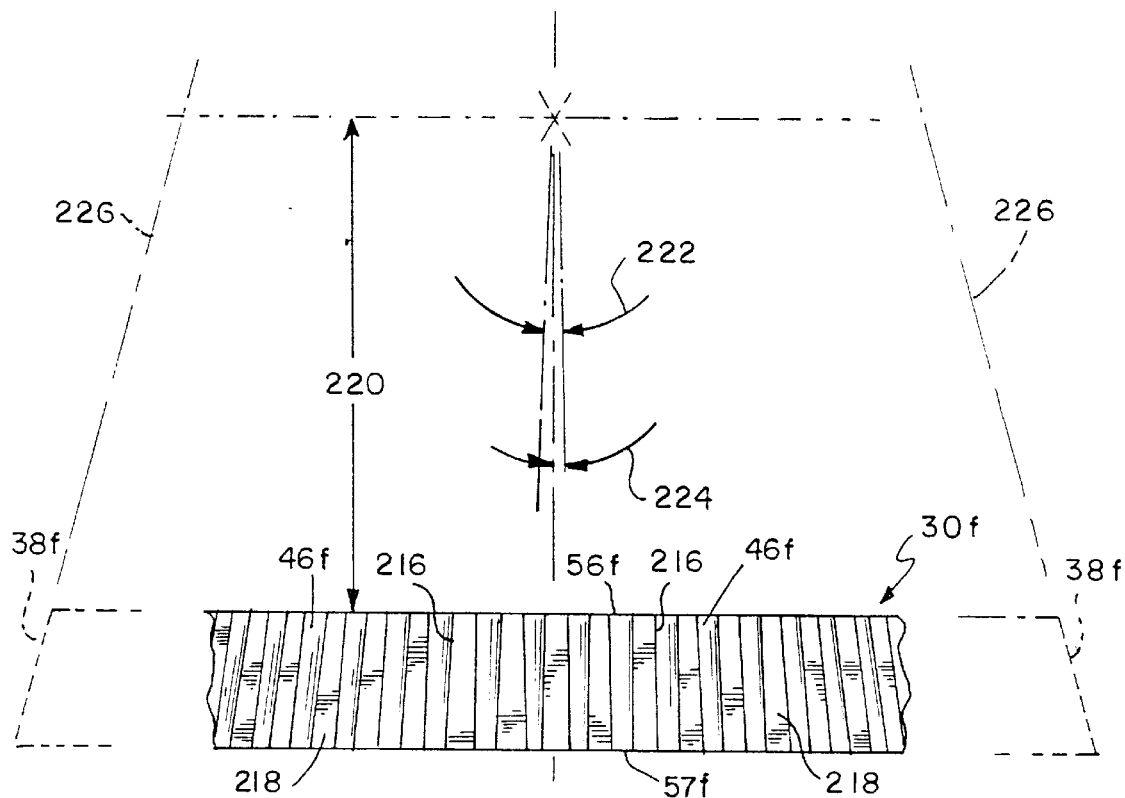
FIG. 42 is a plan view of the collet of FIG. 41 showing that planar projections extending from the side walls defined by each arm intersect at a plane that is parallel to the front and rear end faces of the collet and perpendicular to a central axis of a cone defined by the tapered cam surface of the collet.

FIGS. 41 and 42 show a collet 30f having a plurality of slots 42f that are configured similar to slots 42a of collet 30a shown in FIGS. 26–28 except that slots 42f are defined by a pair of non-parallel side walls 216. Because side walls 216 are non-parallel, each arm 60f has an outer peripheral surface 218 that increases in arc length from front end face 56f to rear end face 57f as shown best in FIG. 42. Side walls 216 of each arm 60f define a pair of planes that intersect at a distance 220 away from front end face 56f. In the illustrated embodiment, side walls 216 of collet 30f form an angle 222 of 2 degrees 19 minutes 55 seconds (2° 19' 55") and each side wall 216 forms an angle 224 of 1 degree 9 minutes 57 seconds (1° 9' 57") with a central plane that extends axially from the center of the respective arm 60f through the apex (not shown) of a reference cone 226 defined by the angle of taper of tapered cam surface 38f.

Forming side walls 216 so that the arc length of outer peripheral surface 218 of each arm 60f is smaller at front end face 56f than at rear end face 57f, allows the pressure exerted on peripheral surface 218 of each arm 60f by actuator member 50 to be distributed more uniformly than is the case with collets having arms with parallel side walls. The increase in uniformity of pressure distribution on each peripheral surface 218 enhances the ability of workpiece grip surface 34f to maintain a cylindrical shape during axial movement of actuator member 50. This is because, as actuator member 50 axially moves to flex collet 30f circularly, the portion of tapered surface 52 of actuator member 50 that contacts tapered cam surface 38f has a continuously decreasing radius of curvature while the radius of curvature of outer peripheral surface 218 of each arm remains constant. Thus, as actuator member 50 axially moves, there is less conformance between the radius of curvature of tapered surface 52 of actuator member 50 and the radius of curvature of outer peripheral surface 218 of each arm 60f.

The non-perfect conformance between tapered surface 52 of actuator member 50 and outer peripheral surface 218 of each arm 60f, as actuator member 50 moves axially, causes larger stresses to be generated at the portions of each outer peripheral surface 218 that are closely adjacent to respective side walls 216 compared to the central portion of each outer peripheral surface 218. Thus, outer peripheral surface 218 of each arm 60f has a tendency to "bridge" circumferentially tapered surface 52 of actuator member 50. If the side walls of each collet arm are parallel, as is the case with, for example, side walls 192 of collet 30a, a larger amount of bridging occurs adjacent to front end face 56a than rear end face 57a, which causes workpiece grip surface 38a to have a tendency to become very slightly conical in shape rather than maintaining a cylindrical shape. The occurrence of bridging is alleviated by having side walls 216 configured in the non-parallel configuration shown in FIGS. 41 and 42. By adjusting the amount of non-parallelism between the side walls of the collet arms, a desired reduction in the amount of bridging can be achieved.

An alternative embodiment collet 230 in accordance with the present invention is shown in FIG. 43. Collet 230 includes a pair of collet body halves 231, each having an inner semi-circular periphery 232 formed with a workpiece grip surface 234, an outer semi-circular periphery 236 formed with a tapered cam surface 238, a pair of end portions 237 and a center portion 239. Collet 230 is formed to include two openings 240 that separate collet 230 into collet body halves 231. Collet 230 is also formed to include a plurality of circumferentially spaced-apart slots 242, each of which includes an open end 244 at tapered cam surface 238 and an inner end 246, as shown in FIG. 44, between inner and outer semi-circular peripheries 232, 236. Collet 230 includes a front end face 256 and a rear end face 257, shown in FIGS. 45 and 46, that is substantially parallel to front end face 256. Each collet body half 231 is formed to include an anti-rotation slot 254 in rear end face 257 at a position midway between openings 240.

Slots 242 are configured so that inner ends 246 of slots 242 define an elliptical pattern around collet 230 as shown in FIG. 43. Slots 242 adjacent to openings 240 at end portions 237 are deeper than slots 242 that are midway between openings 240 at center portion 239. Thus, slots 242 at end portions 237 have a depth 243 measured from open ends 244 to inner ends 246 that is different than depth 243 at center portion 239. Depth 243 of slots 242 make a gradual transition from end portions 237 to center portion 239.

Configuring slots 242 so that inner ends 246 define an elliptical shape, results in each collet body half 231 having a circumferentially varying flexibility characteristic. The collet body halves 231 are more flexible in the region adjacent to openings 240 than in the central region between openings 240.

A pair of anti-rotation pins 255 are coupled to chuck body 58 and extend axially into anti-rotation slots 254 as shown in FIGS. 45 and 46. Each anti-rotation slot 254 is bordered by a pair of slot side walls 248. Engagement between anti-rotation pins 255 and respective slot side walls 248 prevents collet body halves 231 from rotating relative to chuck body 58 and actuator member 50. Anti-rotation slots 254 extend radially to allow radial sliding movement of slot side walls 248 relative to anti-rotation pins 255. Thus, as actuator member 50 moves in direction 54, as shown in FIG. 45, collet body halves 231 can move from a position shown in FIG. 45 to a position, shown in FIG. 46, without rotation between collet body halves 231 and chuck body 58.

When collet 230 is flexed circularly to grip workpiece 48, the portions of workpiece grip surface 234 that are radially aligned with respective anti-rotation slots 254 are constrained to move radially into engagement with workpiece 48, as described above, and the rest of each collet body half 231 must flex circularly to "wrap around" workpiece 48. Thus, the portions of each collet body half 231 that are nearer to openings 240 must flex by a greater amount before engaging workpiece 48 than portions of each collet body half 231 that are further away from openings 240. Forming slots 242 so that collet body halves 231 are more flexible in the region adjacent to openings 240 than in the central region between openings 240 decreases the magnitude of tensile and compressive stresses that are generated in the portions of collet body halves 231 that flex more than other portions of collet body to establish gripping engagement between workpiece grip surface 234 and workpiece 48. Thus, the elliptical slot pattern around collet 230 results in tensile and compressive stresses being distributed more uniformly around collet 230 than would be the case if each slot 242 had the same depth.

Each opening 240 is bounded on either side by a pair of circumferentially facing end surfaces 241 that confront one another as shown in FIGS. 43 and 44. When collet 230 is flexed circularly, end surfaces 241 of one collet body half 231 move toward end surfaces 241 of the other collet body half 231 to narrow each opening 240.

Slots 242 have a very narrow width, as shown in FIG. 44, thus illustrating another possible slot shape and size in addition to those shown in FIGS. 2 and 26–42. Each collet body half 231 is formed to include a shim slot 250 adjacent to each opening 240. A shim 251 extends across each opening 240 and opposite ends of each shim 251 are received in respective shim slots 250 as shown in FIG. 44. Shims 251 help keep collet body halves 231 aligned and also block debris from moving radially through openings 240 during the use of collet 230 in a machine-tool chuck.

Figure 47:
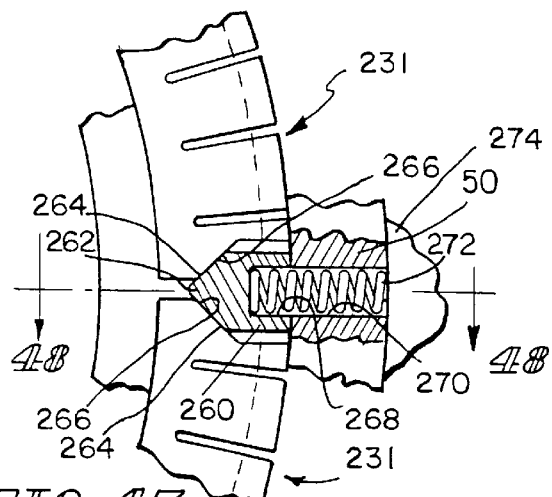
FIG. 47 is an enlarged front view of a collet, similar to the collet of FIG. 43, showing a first embodiment control block having wedge surfaces that are spring-biased against complementary surfaces formed in each of the collet body halves.
Figure 48:
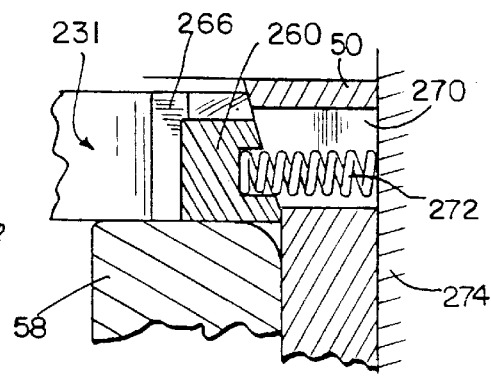
FIG. 48 is a sectional view taken along line 48—48 of FIG. 47.

Although collet 230 is shown in FIGS. 43 and 44 as including shim slots 250 that receive shim 251, other devices that block openings 240 and that align collet body halves 231 are possible. For example, a first embodiment control block 260 having a V-shaped inner end 262 with wedge surfaces 264 that engage respective complementary surfaces 266 formed in each collet body half 231 is shown in FIG. 47. Control block 260 is formed to include a radially-extending bore 268 and actuator member 50 is formed to include an axially-extending slot 270, shown in FIG. 48, adjacent to control block 260. A coil spring 272, a part of which is received in slot 270 and a part of which is received in bore 268, is compressed between control block 260 and an outer chuck body member 274.

Spring 272 acts between outer chuck body member 274 and control block 260 to bias wedge surfaces 264 of control block 260 against complementary surfaces 266 of collet body halves 231. The spring-biased engagement between surfaces 264, 266 helps keep collet body halves 231 aligned and also blocks debris from moving radially through openings 240 during the use of collet 230 in a machine-tool chuck.

Figure 49:
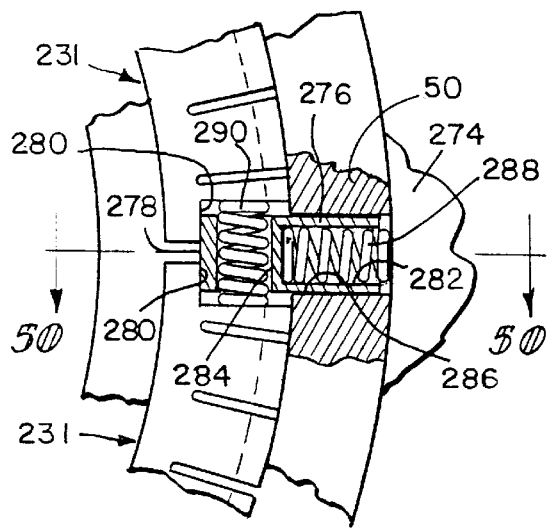
FIG. 49 is an enlarged front view of a collet, similar to the collet of FIG. 47, showing a second embodiment control block having a flat inner surface that is spring-biased against complementary flat surfaces formed in each of the collet body halves.
Figure 50:
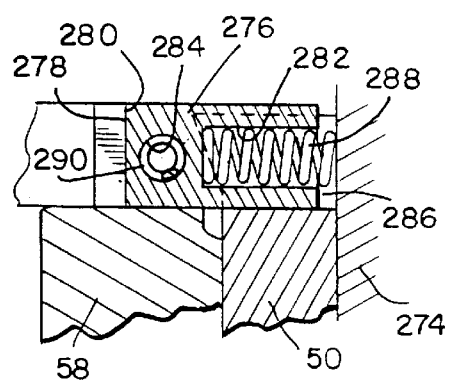
FIG. 50 is a sectional view taken along line 50—50 of FIG. 49.

A second embodiment control block 276 having a flat inner end surface 278 that engages respective complementary surfaces 280 formed in each collet body half 231 is shown in FIG. 49. Control block 276 is formed to include a radially-extending bore 282 and a circumferentially-extending bore 284. In addition, actuator member 50 is formed to include an axially-extending slot 286, shown in FIG. 50, that is configured to receive a portion of control block 276 therein. A radial coil spring 288 is received in bore 282 and is compressed between control block 276 and outer chuck body member 274. A circumferential coil spring 290 is received in bore 284 and is compressed between collet body halves 231.

Spring 288 acts between outer chuck body member 274 and control block 276 to bias portions of flat inner end surface 278 of control block 276 against respective complementary surfaces 280 formed in collet body halves 231. The spring-biased engagement between surfaces 278, 280 helps keep collet body halves 231 aligned and also blocks debris from moving radially through openings 240 during the use of collet 230 in a machine-tool chuck. Spring 290 acts between collet body halves 231 to separate collet body halves 231 away from one another so that when actuator member 50 becomes unactuated and collet body halves 231 unflex, collet body halves 231 are also moved on anti-rotation pins 255 diametrically away from one another.

Figure 51:
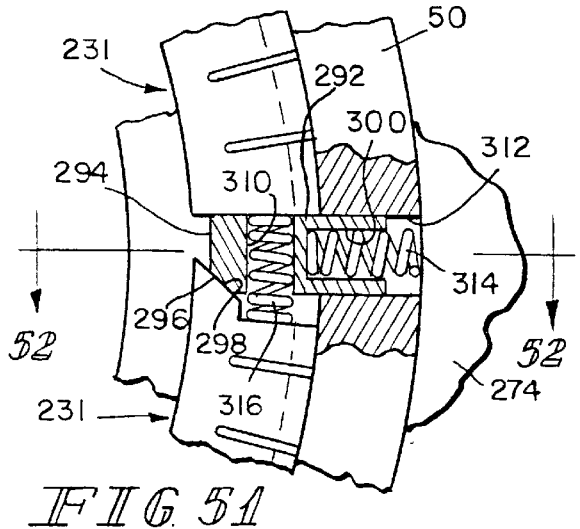
FIG. 51 is an enlarged front view of a collet, similar to the collet of FIG. 49, showing a third embodiment control block having a flat inner surface and a wedge surface that is spring-biased against a complementary surface formed in one of the collet body halves.
Figure 52:
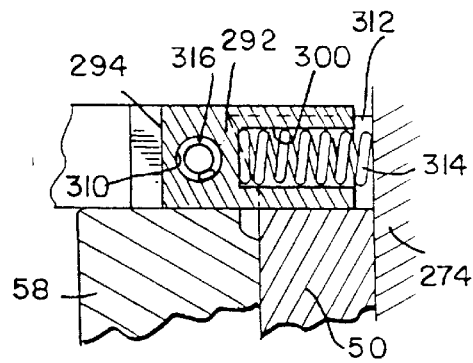
FIG. 52 is a sectional view taken along line 52—52 of FIG. 51.

A third embodiment control block 292 having a flat inner end surface 294 and a wedge surface 296 that engages a complementary surface 298 formed in one of the collet body halves 231 is shown in FIG. 51. Control block 292 is formed to include a radially-extending bore 300 and a circumferentially-extending bore 310. In addition, actuator member 50 is formed to include an axially-extending slot 312, shown in FIG. 52, that is configured to receive a portion of control block 292 therein. A radial coil spring 314 is received in bore 300 and is compressed between control block 292 and outer chuck body member 274. A circumferential coil spring 316 is received in bore 310 and is compressed between collet body halves 231.

Spring 314 acts between outer chuck body member 274 and control block 292 to bias wedge surface 296 of control block 292 against respective complementary surface 298. The spring-biased engagement between surfaces 296, 298 helps keep collet body halves 231 aligned and also blocks debris from moving radially through openings 240 during the use of collet 230 in a machine-tool chuck. Spring 316 acts between collet body halves 231 to separate collet body halves 231 away from one another so that when actuator member 50 becomes unactuated and collet body halves 231 unflex, collet body halves 231 are also moved on anti-rotation pins 255 diametrically away from one another.

An alternative embodiment collet 330 in accordance with the present invention is shown in FIG. 53. Collet 330 includes four collet body segments 331, each having an inner arcuate periphery 332 formed with a workpiece grip surface 334 and each having an outer arcuate periphery 336 formed with a tapered cam surface 338. Collet 330 is formed to include four openings 340 that separate collet 330 into collet body segments 331. Collet 330 is also formed to include a plurality of circumferentially spaced-apart slots 342, each of which includes an open end 344 at tapered cam surface 338 and an inner end 346 between inner and outer arcuate peripheries 332, 336. Collet 330 includes a front end face 356 and a rear end face 357, shown in FIGS. 54 and 56, that is substantially parallel to front end face 356. Each collet body segment 331 is formed to include an anti-rotation slot 354 in rear end face 357 at a position midway between openings 340.

Four anti-rotation pins 355 are coupled to a chuck body 358, as shown in FIG. 53. Anti-rotation pins 355 extend axially into anti-rotation slots 354 in the same manner that anti-rotation pins 255 extend into anti-rotation slots 254 as shown in FIGS. 45 and 46 with reference to collet 230. Each anti-rotation slot 354 is bordered by a pair of slot side walls 348. Engagement between anti-rotation pins 355 and respective slot side walls 348 prevents collet body segments 331 from rotating relative to chuck body 358 and actuator member 50. Anti-rotation slots 354 extend radially to allow radial sliding movement of slot side walls 348 relative to anti-rotation pins 355. Thus, as actuator member 50 is actuated, collet body segments 331 move radially inwardly and workpiece grip surfaces 334 engage workpiece 48 without rotation between collet body segments 331 and chuck body 358.

When collet body segments 331 of collet 330 are moved by actuator member 50 into engagement with workpiece 48, the portions of workpiece grip surface 334 that are radially aligned with respective anti-rotation slots 354 are constrained to move radially into engagement with workpiece 48, as described above, and the rest of each collet body segment 331 deflects into conformance with workpiece 48. The portions of each collet body segment 331 that are nearer to openings 340 must flex by a greater amount before engaging workpiece 48 than the portions of each collet body segment 331 that are further away from openings 340. However, because each collet body segment 331 extends circumferentially around workpiece 48 by slightly less than 90 degrees, the amount of flexing required at the ends of each collet body segment 331 is less than is required for collets 30, 230 which have less openings than collet 330.

Each opening 340 is bounded on either side by a pair of circumferentially facing end surfaces 341 that confront one another as shown in FIG. 53. When collet 330 is flexed circularly, end surfaces 341 of adjacent collet body segments 331 move toward one another to narrow each opening 340.

The flexing of each collet body segment 331 into conformance with workpiece 48 creates tensile stresses at outer arcuate periphery 336 and compressive stresses at the inner arcuate periphery 332 of each collet body segment 331. Forming slots 342 in collet 330 enhances the flexibility of each collet body segment 331 and decreases the magnitude of tensile and compressive stresses that are generated throughout collet body segments 331 as gripping engagement is established between workpiece grip surfaces 334 and workpiece 48. In addition, forming slots 342 in collet 330 allows the workpiece gripping force around workpiece 48 to be distributed more uniformly than would be the case if each collet body segment 331 was not formed with slots 342.

Each collet body segment 331 is formed to include a shim slot 350 adjacent to each opening 340. A shim 351 extends across each opening 340 and opposite ends of each shim 351 are received in respective shim slots 350 as shown in FIG. 53. Shims 351 help keep collet body segments 331 aligned and also block debris from moving radially through openings 340 during the use of collet 330 in a machine-tool chuck. Any of the devices shown in FIGS. 47–52 can alternatively be used to align collet body segments 331 and to block openings 340 if the proper modifications to collet body segments 331 are made to accommodate these devices.

In the illustrative embodiment of collet 330, each collet body segment 331 is biased toward a radial outward position by a respective pair of coil springs 360 shown in FIGS. 53 and 54. Each coil spring 360 of each pair of coil springs 360 is coupled to the respective collet body segment 331 adjacent to respective openings 340 so that coil springs 360 of each pair of coil springs 360 are circumferentially spaced apart by nearly 90 degrees. A plurality of pockets 362, each of which receive a respective coil spring 360, are formed in chuck body 358. Pockets 362 are sufficiently deep so as to allow rear end face 357 of collet 330 to abut a front surface 359 of chuck body 358 without interference from coil springs 360.

Each coil spring 360 includes an axially forwardly-extending free end 364 and an axially rearwardly-extending free end 366 as shown in FIG. 54. A pair of bores 368 are formed in each collet body segment 331 and a plurality of bores 370 are formed in chuck body 358. Free ends 364 of coil springs 360 are received in respective bores 368 and free ends 370 of coil springs 360 are received in respective bores 370. Each of bores 370 are substantially radially aligned with respective bores 368 so that the biasing force of each coil spring 360 is directed in a substantially radial manner. When collet 330 is assembled into a machine-tool chuck, coil springs 360 are tensioned slightly to bias each collet body segment 331 into engagement with actuator member 50 of the machine-tool chuck. When actuator member 50 is actuated and collet body segments 331 are each moved radially inwardly and flexed circularly to conform to workpiece 48, coil springs 360 are extended and further tensioned as shown in FIG. 54. When actuator member 50 becomes unactuated, coil springs 360 pull each collet body segment 331 away from workpiece 48 while maintaining each collet body segment 331 in spring-biased engagement with actuator member 50.

In an alternative embodiment of collet 330, each collet body segment 331 is biased toward a radial outward position by a respective pair of coil springs 372 shown in FIGS. 55 and 56. Each coil spring 372 of each pair of coil springs 372 is coupled to the respective collet body segment 331 adjacent to respective openings 340 so that coil springs 372 of each pair of coil springs 372 are circumferentially spaced apart by nearly 90 degrees. A plurality of pockets 374, each of which receive a respective coil spring 372, are formed in chuck body 358. Pockets 374 are sufficiently deep so as to allow rear end face 357 of collet 330 to abut front surface 359 of chuck body 358 without interference from coil springs 372.

Each coil spring 372 includes an axially forwardly-extending free end 376 and an axially rearwardly-extending free end 378 as shown in FIG. 56. A pair of bores 380 are formed in each collet body segment 331 and a plurality of bores 382 are formed in chuck body 358. Free ends 376 of coil springs 372 are received in respective bores 380 and free ends 378 of coil springs 372 are received in respective bores 382. When collet 330 is assembled into a machine-tool chuck, coil springs 372 are slightly extended to bias each collet segment 331 into engagement with actuator member 50 of the machine-tool chuck. When actuator member 50 is actuated and collet body segments 331 are each moved radially inwardly and flexed circularly to conform to workpiece 48, coil springs 372 are further extended. When actuator member 50 becomes unactuated, coil springs 372 pull each collet body segment 331 away from workpiece 48 while maintaining each collet body segment 331 in spring-biased engagement with actuator member 50.

An alternative embodiment of a collet 630 is shown in FIGS. 57–60. Collet 630 is similar to collet 30 and will use identical element numbering unless otherwise indicated. Each end surface 41 of collet 630 is biased circularly outward away from the other end surface 41 by a coil springs 632 as shown in FIGS. 57 and 58. Coil spring 632 is coupled to collet 630 adjacent to opening 40 so that coil spring 632 extends across opening 40.

Each coil spring 632 includes a first end 634 and a second end 636 as shown in FIG. 58. A pair of pockets 638, each of which receive a free end 634, 636 are formed in collet 630 in end surfaces 41. Pockets 638 are sufficiently deep so as to allow rear end face 357 of collet 630 to abut front surface 359 of chuck body 358 without interference from coil spring 632 as shown in FIG. 60. Collet 630 is also formed to include a pair of bores 640. First free end 634 is received in one of the bores 640 and second free end 636 is received in the other bore 640. Thus, collet 630 is coupled together across opening 40.

When collet 630 is assembled into a machine-tool chuck, coil springs 632 are slightly compressed to bias collet 630 into engagement with actuator member 50 of the machine-tool chuck. When actuator member 50 is actuated and collet 630 is moved radially inwardly and flexed circularly to conform to workpiece 48, coil springs 632 are further compressed. When actuator member 50 becomes unactuated, coil spring 632 push collet 630 away from workpiece 48 while maintaining collet 630 in spring-biased engagement with actuator member 50. Pockets 638 may also be used on collet 430 with coil springs pre-biased in tension.

Collet 430 is shown in FIGS. 61–67. Collet 430 is flexed outwardly to grip the inside diameter of workpiece 448 as previously described. Collet 430 includes a collet body 431 with an outer circular periphery 432 having a workpiece grip surface 434 and an inner circular periphery 436 having a tapered cam surface 438 as shown in FIG. 61. Collet 430 is formed to include an opening 440 extending through collet body 431 between inner and outer circular peripheries 432, 436. Collet 430 is also formed to include a plurality of circumferentially spaced-apart slots 442, each of which includes an open end 444 at tapered cam surface 438 and an inner end 446, shown best in FIG. 62, between inner and outer circular peripheries 432, 436. Collet 430 includes a front end face 456 and rear end face 457 that is substantially parallel to front end face 456. Slots 442 and opening 440 each extend axially all the way through collet 430 but only opening 440 extends radially all the way through collet 430.

Collet 430 is designed to flex circularly about an axis 447 so that workpiece grip surface 434 engages a workpiece, such as workpiece 448 shown in FIG. 61, to grip the workpiece. Workpiece 448 includes an inner surface 449 defining the inside diameter (I.D.) of workpiece 448. In use, collet 430 is flexed circularly, for example, by an annular actuator member 450 having a tapered surface 452 that is complementary to the tapered cam surface 438 of collet 430. Axial movement of actuator member 450 in a direction indicated by arrow 454 in FIG. 61 causes tapered surface 452 of actuator member 450 to engage tapered cam surface 438 of collet 430 resulting in circular or circumferential flexing of collet 430 so that workpiece grip surface 434 expands into gripping engagement with workpiece 448.

Opening 440 is bounded on either side by a pair of circumferentially facing end surfaces 441 that confront one another as shown in FIG. 61. When collet 430 is flexed circularly, in response to movement of actuator member 450 in direction 454, end surfaces 441 move away from one another, thereby widening opening 440.

A backing plate or a chuck body 458, a portion of which is shown in FIG. 61, is provided in some instances to constrain collet 430 from moving axially along with actuator member 450. Other structures that prevent collet 430 from moving axially along with actuator member 450 can be provided instead of backing plate 458. Thus, actuator member 450 moves axially relative to both chuck body 458 and collet 430 to cause radial and circumferential flexing of collet 430 relative to workpiece 448.

Opening 440 and slots 442 enhance the circumferential flexibility of collet 430. As any non-slotted ring-shaped or circular part having an opening therethrough is flexed circumferentially to widen the opening, compressive stresses are generated at the outer diameter (O.D.) of the part and tensile stresses are generated at the inner diameter (I.D.) of the part. As previously discussed, materials are able to withstand a larger amount of compressive stress than tensile stress before catastrophic failure or plastic deformation of the part occurs. Circumferentially flexing a circular part having an opening therethrough, so as to widen the opening, creates a stress profile through the part between the I.D. and O.D. and a neutral point is established between the I.D. and O.D. such that tensile stresses exist radially inwardly from the neutral point and compressive stresses exist radially outwardly from the neutral point.

Figure 62:
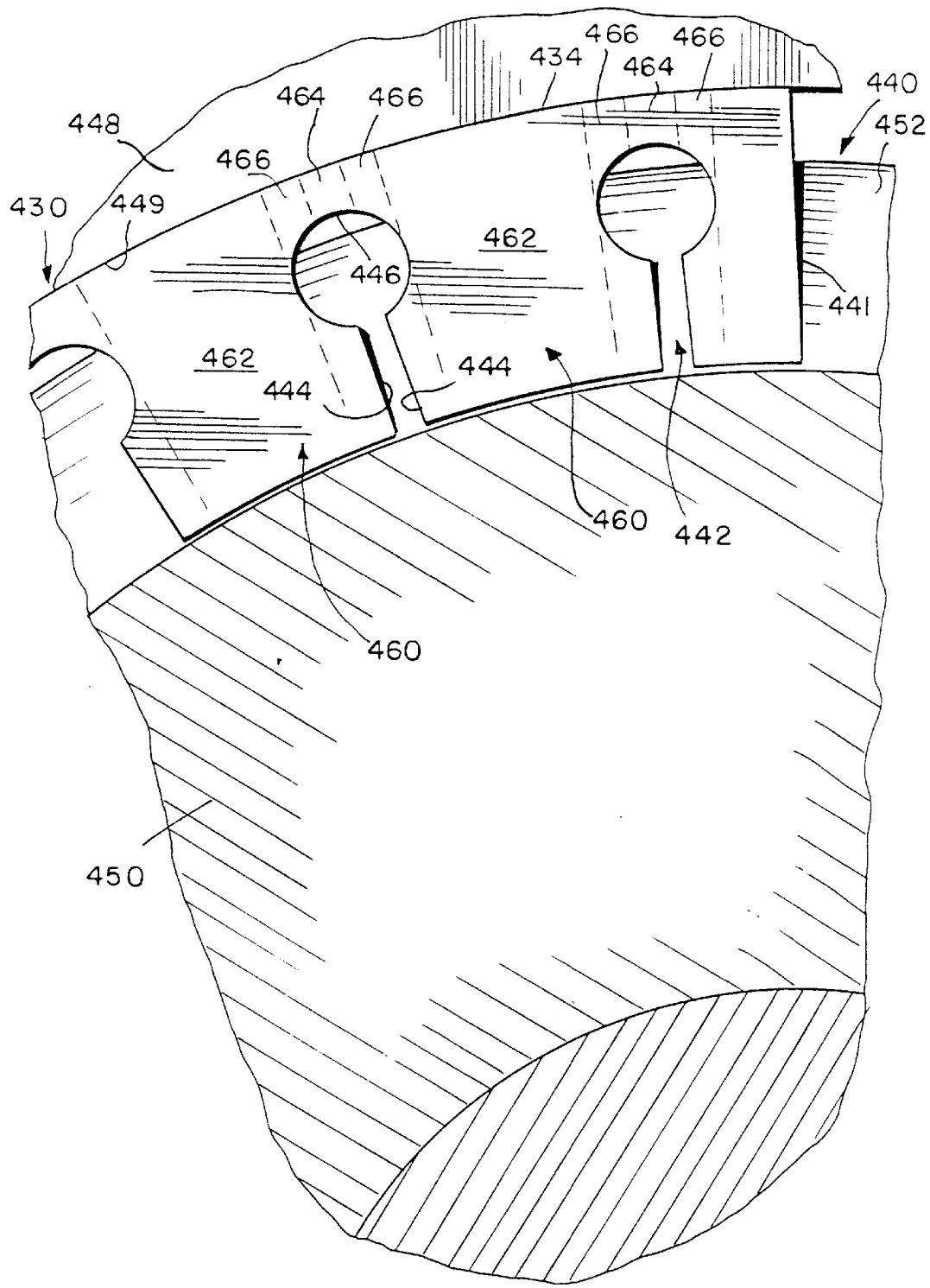
FIG. 62 is an enlarged view of the collet of FIG. 61 showing a small amount of collet material between an inner end of each slot and the bore of the workpiece to provide a flex zone radially outwardly of the inner end of each slot and a large amount of collet material between the slots to provide the collet with a plurality of arms, each having a force-transmission zone that is less flexible than the flex zones.

The formation of slots 442 in collet body 431 alters the manner in which the stress profile through collet 430 develops as collet 430 is flexed circularly. Slots 442 subdivide the inner portion of collet 430 into a plurality of arms 460. Each arm 460 provides a force-transmission zone 462 between tapered cam surface 438 and workpiece grip surface 434 as shown in FIG. 62. In addition, formation of slots 442 creates a plurality of flex zones 464 between inner ends 446 of respective slots 444 and workpiece grip surface 434 as also shown in FIG. 62. Each flex zone 464 is more flexible than each force-transmission zone 462. A transition zone 466 exists between each force-transmission zone 462 and each flex zone 464. It should be understood that the lines of demarcation between force-transmission zones 462, flex zones 464, and transition zones 466, shown in FIG. 62, are merely diagrammatic in nature to facilitate the description of the operation of collet 430.

As collet 430 is flexed circularly to grip workpiece 448, each of the flex zones 464 flexes more than each of the force-transmission zones 462 due to the small amount of collet material in each of the flex zones 464 compared to each of the force-transmission zones 462. In addition, slots 442 serve to isolate each arm 460 from each of the next adjacent arms so that each arm 460 is cantilevered independently to extend radially inwardly from the outer circular periphery 432 of collet body 431. The absence of collet material between arms 460 allows arms 460 to fan out as collet 430 is flexed circularly, thereby allowing open end 444 of each slot 442 to widen. The slotted configuration of collet 430 results in reduced tensile stresses throughout arms 460 compared to the tensile stresses that would exist in the "arms" if slots were not formed in collet 430. Thus, slots 442 "relieve" the tensile stresses at the inner circular periphery 436 of collet body 431. The reduced tensile stress in each arm 460 contributes to the increased flexibility of collet 430 due to the reduction in resistance to flexing that inherently is achieved when tensile stresses are reduced as described above.

When actuator member 450 is actuated to flex collet 430 circularly into gripping engagement with workpiece 448, each arm 460 of collet 430 is wedged between actuator member 450 and workpiece 448. Thus, the force acting on actuator member 450 to move actuator member 450 axially in direction 454 is transmitted to workpiece 448 through arms 460. Collet 430 and actuator member 450 are carefully manufactured, in a manner similar to that of collet 30 and actuator member 50 described above, so as to mate together closely. The close mating between collet 430 and actuator member 450 results in essentially the same amount of force being transmitted through each force-transmission zone 462 to workpiece 448. Because force-transmission zones 462, transition zones 466, and flex zones 464 are integrally appended to one another so that outer circular periphery 432 is one continuous piece, interrupted only by opening 440, the force transmitted through each force-transmission zone 462 can spread out through the next adjacent transition zones 466 and flex zones 464 to workpiece grip surface 434. The spreading of force from force-transmission zones 462 into transition zones 466 and flex zones 464 allows a substantially uniform gripping force about workpiece 448 to be established.

The amount of gripping force transferred from actuator member 450 to workpiece 448 is dependent upon the angle of taper between tapered cam surface 438 and workpiece grip surface 434 of collet 430 as was the case with collet 30. Multiplying the axial force applied to actuator member 450 along direction 454 by the cotangent of the angle between tapered cam surface 438 and workpiece grip surface 434 gives the gripping force generated between workpiece grip surface 434 and workpiece 448. Dividing the calculated gripping force by the area of workpiece grip surface 434 gives the workpiece gripping pressure established between collet 430 and workpiece 448.

Collet 430 can be used in a variety of chucks having different sizes and designs. A chuck 470, which is an example of one possible chuck design in which collet 430 can be used to grip workpiece 448, is shown in FIG. 63. Chuck body 458 of chuck 470 includes a radially outwardly extending annular flange 472 at the rear end thereof and a cylindrical portion 474 extending axially forwardly from annular flange 472 in a cantilevered arrangement. Annular flange 472 is formed to include a large bore defined by a rear bore surface 476 and cylindrical portion 474 is formed to include a reduced-diameter bore defined by a cylindrical bore surface 478.

Chuck body 458 includes a shoulder or wall 480 extending radially between bore surface 476 and cylinder bore surface 478 as shown in FIG. 63. Annular flange 472 has a rear surface 482 and a front surface 484. Chuck 470 is mounted on a rotatable spindle of a machine tool, such as a lather or a grinder, by a plurality of bolts (not shown) that extend through bolt holes 486.

A ram 487 of chuck 470 includes a rear member 488 and a front member 490. Rear member 488 includes a piston rod or guide portion 492 and a piston or annular flange portion 494 appended to the rear end of guide portion 492. Guide portion 492 includes an outer cylindrical surface 496 that slidingly engages cylindrical bore surface 478 of chuck body 458. Front member 490 includes a piston rod or guide portion 498 and an annular flange portion 500 appended to the front end of guide portion 498. Guide portion 498 includes an outer cylindrical surface 510 that is coextensive with outer cylindrical surface 496 of guide portion 492 and that slidingly engages cylindrical bore surface 478 of chuck body 458.

Guide portion 492 of rear member 488 includes a flat front surface 512 and guide portion 498 of front member 490 includes a flat rear surface 514. Front member 490 is formed to include a bolt hole 516 and rear member 488 is formed to include a bolt hole 518. A bolt 520 is inserted through bolt hole 516 and is received in bolt hole 518 to engage rear member 488 threadedly so that, after bolt 520 is tightened, front surface 512 is seated against rear surface 514. When front and rear members 488, 490 of ram 487 are fastened together by bolt 520, cylindrical portion 474 of chuck body 358 is trapped between annular flange portions 494, 500 as shown in FIG. 63.

Cylindrical portion 474 of chuck body 458 includes a radially-extending front end face 522. Annular flange portion 500 of front member 490 includes a radially-extending rear end face 524 arranged in confronting relation with front end face 522. In addition, annular flange portion 500 includes a front end face 526. Chuck body 458 includes a plurality of dowel pin holes 528 with openings at front end face 522. Annular flange portion 500 includes a plurality of doles pin holes 530 extending between the rear and front end faces 524, 526 thereof A dowel pin 532 is press fit into each dowel pin hole 528 formed in chuck body 458 and extends axially forwardly into a respective dowel pin hole 530 formed in annular flange portion 500. As ram 587 slides axially relative to chuck body 458, dowel pins 532 remain stationary relative to chuck body 458 to help guide the movement of ram 532 and to prevent ram 587 from rotating relative to chuck body 458.

Cylindrical portion 474 is formed to include a large-diameter outer cylindrical surface 534 adjacent to front surface 484 of annular flange 472, a small-diameter outer cylindrical surface 536 adjacent to front end face 522, and an intermediate-diameter cylindrical surface 538 between cylindrical surfaces 534, 536 as shown in FIG. 63. A first shoulder or workpiece seat 540 extends radially between surfaces 534, 538 and a second shoulder or collet seat 542 extends radially between surfaces 536, 538. Rear end face 457 of collet 430 abuts collet seat 542. Workpiece 448 includes an end face 544 that abuts workpiece seat 540 when workpiece 548 is mounted on chuck 470.

Actuator member 450 includes an inner cylindrical surface 550 that slidingly engages outer cylindrical surface 536 of chuck body 458. Surfaces 538, 550 are machined so as to minimize the radial play between actuator member 450 and chuck body 458 while still allowing actuator member 450 to slide relative to chuck body 458. Thus, the fit between inner cylindrical surface 550 of actuator member 450 and outer cylindrical surface 538 of chuck body 458 is closely toleranced so that the concentricity between actuator member 450 and chuck body 458 is optimized.

Actuator member 450 includes a rear end face 546 arranged in confronting relation with collet seat 542 and a front end face 548 arranged in abutting relation with rear end face 524 of annular flange 500. Actuator member 450 also includes a cylindrical outer surface 552. Tapered surface 452 extends between outer surface 552 and rear end face 546 and collet 430 is situated around actuator member 450 so that tapered cam surface 438 of collet 430 engages tapered surface 452 of actuator member 450.

Annular flange portion 494 of rear member 488 of ram 487 includes an outer cylindrical surface 554 that slidingly engages rear bore surface 476 formed in annular flange 472 of chuck body 458 as shown in FIG. 62. A first O-ring seal 556 is mounted in a groove formed in surface 554 and sealingly engages rear bore surface 476. In addition, a second O-ring seal 558 is mounted in a groove formed in outer cylindrical surface 496 of rear member 488 and sealingly engages cylindrical bore surface 478 of chuck body 458.

Annular flange portion 494 of rear member 488 includes an annular front surface 560 arranged in confronting relation with wall 480 of chuck body 458. Rear member 488 is formed to include an annular spacer shoulder 562 between annular flange portion 494 and guide portion 498 of rear member 488. A fluid-receiving chamber 564 is defined between wall 480 and front surface 560. Chuck body 458 is formed to include a fluid inlet port 566 and a fluid passage 568 in fluid communication with both fluid inlet port 566 and fluid-receiving chamber 564.

Chuck 470 includes a plurality of compression springs 570, each of which includes a rear end mounted in a bore 572 formed in cylindrical portion 474 of chuck body 458 and a front end mounted in an aligned bore 574 formed in actuator member 450. Receipt of compression springs 570 in bores 572, 574 constrains actuator member 450 from rotating relative to chuck body 458. When actuator member 450 is in an unactuated position, compression springs 570 bias actuator member 450 into engagement with annular flange portion 500 of front member 490. In addition, compression springs 570 act through actuator member 450, front member 490 of ram 487, and bolt 520 to bias annular spacer shoulder 562 of rear member 488 into engagement with wall 480 as shown in FIG. 63. When annular spacer shoulder 562 engages wall 480, a first clearance gap 576 is established between front end face 522 of chuck body 458 and rear end face 524 of annular flange portion 500 and a second clearance gap 578 is established between rear end face 546 of actuator member 450 and collet 542.

Figure 64:
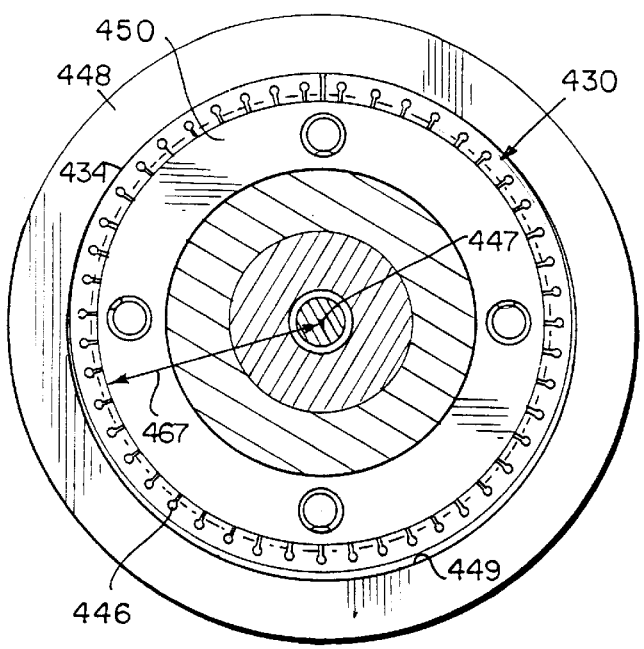
FIG. 64 is a sectional view taken along line 64—64 of FIG. 63 showing a workpiece inner diameter surrounding the outer workpiece-grip surface of the collet.
Figure 65:
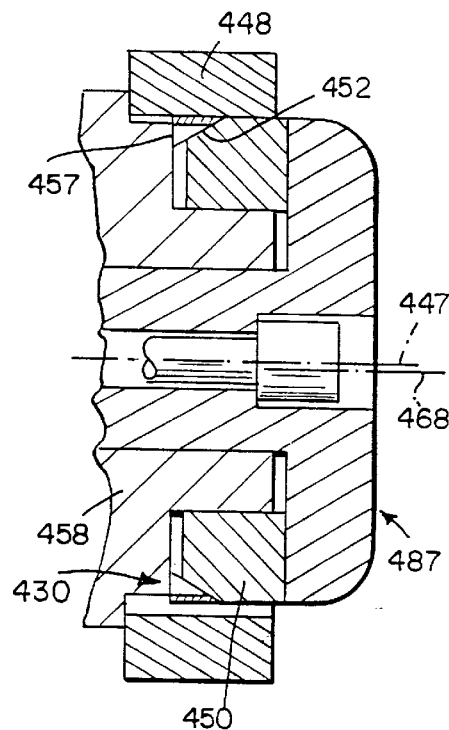
FIG. 65 is a sectional view taken along line 65—65 of FIG. 64.

Before actuator member 450 is actuated, workpiece 448 is inserted onto chuck 470 so that end face 544 abuts workpiece seat 540 as described above. When workpiece 448 is seated initially against workpiece seat 540, collet 430 is in a radially and circumferentially retracted position as shown in FIGS. 64 and 65. In addition, when workpiece 448 is seated against workpiece seat 540 and actuator member 450 is unactuated, a small amount of clearance exists between workpiece 448 and collet 430. The clearance between workpiece 448 and collet 430 permits workpiece 448 to be shifted into an eccentric orientation relative to collet 430 so that an axis 468 of workpiece 448 is offset by a slight amount from axis 447 of collet 430 as shown in FIG. 65.

To actuate actuator member 450, a source of pressurized fluid, such as air or hydraulic fluid, is coupled to fluid inlet port 566 and an amount of pressurized fluid is forced, at a controlled pressure, through fluid inlet port 566 and fluid passage 568 into fluid-receiving chamber 564. Receipt of pressurized fluid in chamber 564 causes a circumferentially uniform force to be exerted against annular front surface 560 of annular flange portion 494 to move ram 487 and actuator member 450 axially relative to chuck body 458 and collet 430 in a rearward direction indicated by arrow 580 shown in FIG. 63. During movement of ram 487 and actuator member 450 in direction 580, first and second clearance gaps 576, 578 are narrowed and compression springs 570 are further compressed.

Figure 66:
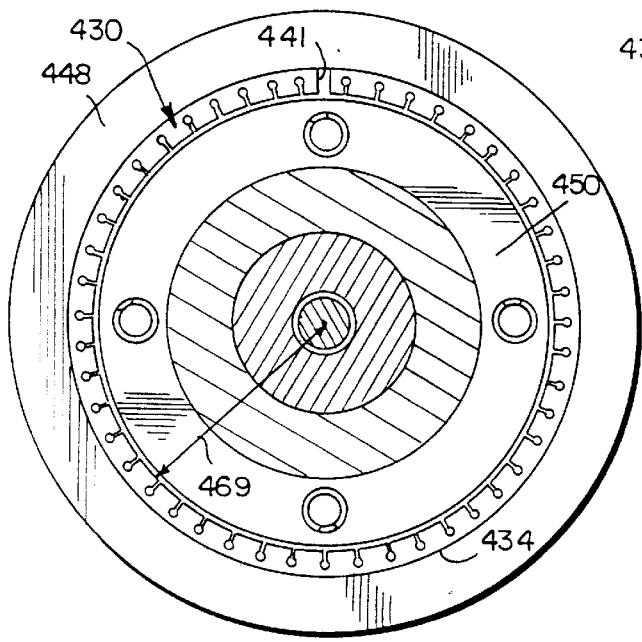
FIG. 66 is a sectional view similar to FIG. 64 after the actuator member has been moved axially so that the tapered surface of the actuator member engages the tapered cam surface of the collet to flex the collet circularly and outwardly into gripping engagement with a bore of the workpiece.
Figure 67:
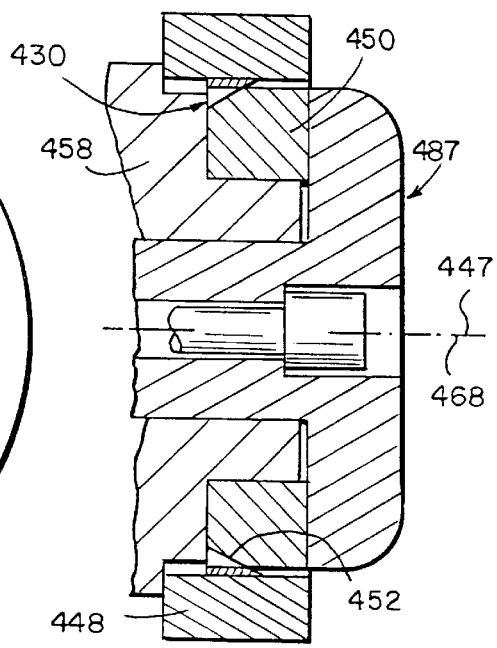
FIG. 67 is a sectional view taken along line 67—67 of FIG. 66.

As actuator member 450 moves in direction 580 in response to pressurized fluid being forced into fluid-receiving chamber 564, tapered surface 452 of actuator member 450 engages tapered cam surface 438 of collet 30 to flex collet 430 circularly so that collet 430 expands both radially and circumferentially to move workpiece grip surface 434 into engagement with workpiece 48 as shown in FIGS. 66 and 67. The flexing motion of collet 430 causes workpiece 448 to be drawn into concentric relation with collet 430 so that axis 468 of workpiece 448 substantially coincides with axis 447 of collet 430 as also shown in FIGS. 66 and 67. When the fluid pressure is released, compression springs 570 act between chuck body 458 and actuator member 450 to move actuator member 450 and ram 487 in an axial direction opposite to direction 580 to permit collet 430 to retract back into its initial unflexed position as shown in FIGS. 63–65.

When actuator member 450 is unactuated, rear end face 457 of collet 30 has an outer diameter 467 and opening 440 has a narrowed configuration, as shown in FIG. 64. When actuator member 450 is actuated to flex collet 430 circularly to grip workpiece 448, rear end face 457 has an outer diameter 469 that is larger than diameter 467 and opening 440 has a widened configuration as shown in FIG. 66.

When actuator member 450 is actuated to flex collet 430 circularly into gripping engagement with workpiece 448, there is relative circumferential movement between collet 430 and actuator member 450 and also between collet 430 and workpiece 448. The complementary fit between tapered surface 452 of actuator member 450 and tapered cam surface 438 of collet 430, along with the circular flexing motion of collet 430, ensures that collet 430 is kept centered relative to actuator member 450 and the circular flexing motion of collet 430 relative to workpiece 448 ensures that workpiece 448 is centered relative to collet 430 when workpiece grip surface 438 of collet 430 attains full contact with workpiece 448.

After collet 430 is flexed circularly into gripping engagement with workpiece 448, workpiece 448 acts against collet 430 to resist further circumferential flexing of collet 430, thereby resisting further axial movement of actuator member 450 in direction 580 relative to chuck body 458. When the resistance of workpiece 448 against collet 430 balances the force of actuator member 450 against collet 430, collet 430 no longer flexes circularly and actuator member 450 no longer moves axially. In this equilibrium state, a controlled gripping force between collet 430 and workpiece 448 is established. Thus, by controlling the pressure of the pressurized fluid, the gripping force of the collet 430 is controlled. Using pressurized fluid to actuate actuator member 450 ensures that the gripping force of collet 430 against successive workpieces having different inner diameters is substantially the same because the gripping force is not dependent on the diameter of workpiece 448 but is controlled only by the pressure of the fluid.

In applications where chuck 470 is rotated at a high speed of rotation, centrifucgal forces may become large enough to cause radial expansion of the various chuck components, such as collet 430 and actuator member 450, as well as workpiece 448. Using pressurized fluid to actuate actuator member 450 ensures that collet 430 is forced against workpiece 448 with a substantially constant gripping force even if radial expansion of the chuck components or workpiece occurs because the pressurized fluid causes actuator member 450 to be adjusted automatically so that the equilibrium state is maintained.

Because collets 30, 230, 330, 430, 630 are substantially round and concentric, substantial eccentricities in workpiece 50 do not develop in the machining process. Likewise, because collets 30, 230, 330, 430, 630 hold outer surface 49 of workpiece 50 in a substantially consistent manor, the inherently varying diameter of outer surface 49 of workpiece 50 do not result in inconsistency in the overall size of the workpieces 50 machined on collets 30, 230, 330, 430, 630. Similarly, because collets 30, 230, 330, 430, 630 hold each successive workpiece 50 in a uniform distribution, nonuniform deformations of workpiece 50 do not result in "runout" in the finished machined workpiece 50. Because collets 30, 230, 330, 430, 630 are not too thin, collets 30, 230, 330, 430, 630 do not grip in an axially varying manner. Because collets 30, 230, 330, 430, 630 have uniform workpiece grip surfaces 34, 234, 334, 434 and do not have a plurality of slots that extend radially all the way through, collets 30, 230, 330, 430, 630 do not have circumferentially spaced-apart gripping segments separated by air gaps that create areas of no grip and arc lengths of the workpiece that are gripped that are not the same as the specific radius of the collet segments. Thus, collets 30, 230, 330, 430, 630 do not have segments that distribute the grip force non-uniformly.

Although the invention has been described in detail with reference to certain preferred embodiments, variations and modifications exist within the scope and spirit of the invention.

I claim:

1. A collet for use in a tool-chuck, the collet comprising a flexible circular collet body having an outer circular periphery and an inner circular periphery, the flexible circular collet body being formed to include an opening extending between the outer and inner circular peripheries and bounded on either side by a pair of collet body ends having end surfaces, one of the circular peripheries being formed to include a workpiece grip surface and the other of the circular peripheres including a tapered cam surface adapted to be engaged to circularly flex the flexible circular collet body so that the workpiece grip surface moves into engagement with a workpiece to be held by the collet, and a shim, each end surface being formed to include a shim slot adapted to receive the shim, the shim being arranged to extend across the opening to block debris from moving radially through the opening during the use of the collet in the tool-chuck and to align the collet body ends in radially inward and outward directions.

2. The collet of claim 1, wherein the tapered cam surface of the flexibly circular collet body is formed to include a plurality of circumferentially spaced slots, each slot has an open end at one of the circular peripheries and each slot terminates at an inner end between the inner and outer circular peripheries.

3. The collet of claim 1, further comprising a front end face and rear end face and the shim slots are formed to extend from the front end face to the rear end face.

4. A collet comprising a circular collet body having an outer circular periphery and an inner circular periphery, one of the circular peripheries being formed to include a workpiece grip surface and the other of the circular peripheries including a tapered cam surface adapted to be engaged so that the workpiece grip surface moves into engagement with a workpiece to be held by the collet, the tapered cam surface being formed to include a plurality of circumferentially spaced slots defined by a pair of side walls, each slot having an open end at one of the circular peripheries and each slot terminating at an inner end between the inner and outer circular peripheries, each side wall of the respective pair of side walls defining a plane that intersects with the other respective plane at a distance away from the collet body so each side wall is not parallel with the other.

5. The collet of claim 4, wherein the planes of each pair of side walls define an angle therebetween of about 2 degrees.

6. A collet comprising a flexible circular collet body having an outer circular periphery and an inner circular periphery, the flexible circular collet body being formed to include a pair of openings extending between the outer and inner circular peripheries and separating the collet body into a pair of collet body halves, one of the circular peripheries being formed to include a workpiece grip surface and the other of the circular peripheries including a tapered cam surface adapted to be engaged to circularly flex the flexible circular collet body so that the workpiece grip surface moves into engagement with a workpiece to be held by the collet, the tapered cam surface being formed to include a plurality of circumferentially spaced slots, each slot having an open end at one of the circular peripheries and each slot terminating at an inner end between the inner and outer circular peripheries, each collet body half includes a pair of end portions and a center portion, each slot has a depth measured from the open end to the inner end, the length of the slots at the end portions of the pair of collet body halves are different than the length of the slots at the center portion of the pair of collet body halves.

7. The collet of claim 6, wherein the length of the slots at the end portions of the pair of collet body halves are greater than the length of the slots at the center portion of the pair of collet body halves.

8. The collet of claim 7, wherein the length of the slots between the slots at the end portions of the pair of collet body halves and the slots at the center portion of the pair of collet body halves gradually transition from the length of the slots at the end portions of the collet body halves to the length of the slots at the center portion of the collet body halves.

9. The collet of claim 8, wherein the gradual transition is elliptical.

10. A collet comprising a flexible circular collet body having an outer circular periphery and an inner circular periphery, the flexible circular collet body being formed to include a pair of openings extending between the outer and inner circular peripheries and separating the collet body into a pair of collet body halves, each opening being bounded on either side by a pair of collet body ends having end surfaces, one of the circular peripheries being formed to include a workpiece grip surface and the other of the circular peripheries including a tapered cam surface adapted to be engaged to circularly flex the flexible circular collet body so that the workpiece grip surface moves into engagement with a workpiece to be held by the collet and a pair of shims, each end surface being formed to include a shim slot adapted to receive one of the shims and each shim being arranged to extend across one of the openings to block debris from moving radially through the openings during the use of the collet and to align the collet body ends in radially inward and outward directions.

11. The collet of claim 10, wherein each of the pair of collet body halves is formed to include an anti-rotation slot adapted to receive an anti-rotation pin.

12. A chuck comprising an actuator member having a tapered surface and formed to include a slot, a collet including a flexible circular collet body having an outer circular periphery and an inner circular periphery, the flexible circular collet body being formed to include an opening extending between the outer and inner circular peripheries and bounded on either side by a pair of end surfaces, one of the circular peripheries being formed to include a workpiece grip surface and the other of the circular peripheries including a tapered cam surface adapted to be engaged by the tapered surface of the actuator member to circularly flex the flexible circular collet body so that the workpiece grip surface moves into engagement with a workpiece to be held by the collet, a spring positioned to lie in the slot of the actuator member, and a block member contacting the spring for engagement with the pair of end surfaces of the flexible circular collet body to block the opening of the flexible circular body.

13. The chuck of claim 12, wherein the block; member is V-shaped and the end surfaces of the flexible circular collet body are adapted to receive the V-shaped block member.

14. The chuck of claim 12, wherein the block member is formed to include a bore, the chuck further comprising another spring positioned to lie within the bore and having a first free end and a second free end, the first free end is engaged with one of the end surfaces of the flexible circular collet body and the second free end is engaged with the other end surface of the flexible circular collet body to bias the flexible circular collet body.

15. The chuck of claim 14, wherein the block member includes a wedge surface and one of the end surfaces of the flexible circular collet body is adapted to engage the wedge surface.

16. A chuck comprising
an actuator member having a tapered surface and formed to include a bore,
a collet including a flexible circular collet body having an outer circular periphery and an inner circular periphery, the flexible circular collet body being formed to include an opening extending between the outer and inner circular peripheries, one of the circular peripheries being formed to include a workpiece grip surface and the other of the circular peripheries including a tapered cam surface adapted to be engaged by the tapered surface of the actuator member to circularly flex the flexible circular collet body so that the workpiece grip surface moves into engagement with a workpiece to be held by the collet, and the flexible circular collet body being formed to include a bore, and
a spring having a pair of free ends, at least one of the actuator member and the flexible circular collet body being formed to include a pocket, the spring being positioned to lie in the pocket, and one of the flee. ends of the spring being positioned to lie in the bore of the actuator member and the other free end of the spring being positioned to lie in the bore of the flexible circular collet body so that the spring radially biases the flexible circular collet body against the actuator member.

17. The chuck of claim 16, wherein the pocket extends radially, and the bore of the actuator member and the bore of the flexible circular collet body are radially spaced apart.

18. The chuck of claim 16, wherein the pocket extends tangentially to the flexible circular collet body, and the bore of the actuator member and the bore of the flexible circular collet body are spaced apart at an angle measured between the bores and the center of the flexible circular collet body.

19. A collet comprising
a flexible circular collet body having an outer circular periphery and an inner circular periphery, the flexible circular collet body being formed to include four openings extending between the outer and inner circular penpheries and separating the collet body into four collet body segments, each opening being bounded on either side by a pair of collet body ends having end surfaces, one of the circular peripheries being formed to include a workpiece grip surface and the other of the circular peripheries including a tapered cam surface adapted to be engaged to circularly flex the flexible circular collet body so that the workpiece grip surface moves into engagement with a workpiece to be held by the collet and
four shims, each end surface being formed to include a shim slot adapted to receive one of the shims, each shim being arranged to extend across one of the openings to block debris from moving radially through the openings during the use of the collet and to align the collet body ends in the radially inward and outward directions.

20. A chuck comprising
an actuator member having a tapered surface,
a flexible circular collet body having an outer circular periphery and an inner circular periphery, the flexible circular collet body being formed to include four openings extending between the outer and inner circular peripheries and separating the collet body into four collet body segments, each opening being bounded on either side by a pair of end surfaces, one of the circular peripheries being formed to include a workpiece grip surface and the other of the circular peripheries including a tapered cam surface adapted to be engaged to circularly flex the flexible circular collet body so that the workpiece grip surface moves into engagement with a workpiece to be held by the collet and
a means for biasing the four collet body segments to an unactuated position in relation to the actuator member.

21. A chuck comprising
an actuator member having a tapered surface and formed to include a bore,
a flexible circular collet body having an outer periphery and an inner circular periphery, the flexible circular collet body being formed to include four openings extending between the outer and inner circular peripheries and separating the collet body into four collet body segments, one of the circular peripheries being formed to include a workpiece grip surface and the other of the circular peripheries including a tapered cam surface adapted to be engaged to circularly flex the flexible circular collet body so that the workpiece grip surface moves into engagement with a workpiece to be held by the collet, and each of the four collet body segments being formed to include a pair of bores, and
a plurality of springs having a pair of free ends, at least one of the actuator member and the four collet body segments being formed to include a plurality of pockets, the springs being positioned to lie in the pockets, and one of the free ends of the springs being positioned to lie in the bores of the actuator member and the other free end of the springs being positioned to lie in the respective bores of the four collet body segments so that the springs radially bias the four collet body segments against the actuator member.

22. A collet comprising
a flexible circular collet body having all outer circular periphery and an inner circular periphery, the flexible circular collet body being formed to include an opening extending between the outer and inner circular peripheries and bounded on either side by a pair of end surfaces, one of the circular peripheries being formed to include a workpiece grip surface and the other of the circular peripheries including a tapered cam surface adapted to be engaged to circularly flex the flexible circular collet body so that the workpiece grip surface moves into engagement with a workpiece to be held by the collet, and
a spring, at least one of the pair of end surfaces being formed to include a pocket, the spring being positioned to lie in the pocket to bias the flexible circular collet body.

23. The collet of claim 22, wherein the flexible circular collet body is formed to include a pair of bores, the spring includes a pair of free ends, one of the free end is positioned to lie in the first bore, and the other free end is positioned to lie in the other bore.

24. A method for making a collet and an actuator member for a tool-chuck, the method including the steps of providing a collet blank including an outer circular periphery and an inner circular periphery, one of the circular peripheries being formed to include a tapered surface, the other circular periphery being formed to include a workpiece grip surface, an actuator blank including a circular periphery formed to include a tapered surface, and a chuck body, assembling the collet blank, actuator blank, and chuck body so that chuck body advances the actuator blank against the chuck blank so that the tapered surface of the actuator blank engages the tapered surface of the collet blank; and machining the workpiece grip surface while the tapered surfaces are engaged.

25. A method for making a collet and an actuator member for a tool-chuck, the method including the steps of providing a plurality of collet blanks including an outer circular periphery and an inner circular periphery, one of the circular peripheries being formed to include a tapered surface, the other circular periphery being formed to include a workpiece grip surface and a plurality of actuator blanks including a circular periphery formed to include a tapered surface, selectively matching one of the plurality of collet blanks with one of the plurality of actuator blanks, marking the selected collet blank and the selected actuator blank as a matched pair, and machining the selected collet blank and actuator blank.

* * * * *